United States Patent [19]
Buchwalter et al.

[11] Patent Number: 5,179,467
[45] Date of Patent: Jan. 12, 1993

[54] CHARGE TRANSFER SALTS AND USES THEREOF

[75] Inventors: Stephen L. Buchwalter, Wappingers Falls; Martin J. Goldberg, Mahopac; Revathi Iyengar, Peekskill; Terrence R. O'Toole, Hopewell Junction; Alfred Viehbeck, Stormville, all of N.Y.

[73] Assignee: International Business Machines Corporation, Armonk, N.Y.

[21] Appl. No.: 583,888
[22] Filed: Sep. 17, 1990

Related U.S. Application Data

[63] Continuation-in-part of Ser. No. 533,611, Dec. 5, 1989, abandoned, and a continuation-in-part of Ser. No. 446,272, Dec. 5, 1989, abandoned.

[51] Int. Cl.$^5$ .................................................. G02F 1/01
[52] U.S. Cl. ..................................... 359/270; 359/272; 359/275
[58] Field of Search ................. 359/265, 270, 272, 275

[56] References Cited

U.S. PATENT DOCUMENTS

| | | | |
|---|---|---|---|
| H264 | 5/1987 | Nicholson et al. | 350/357 |
| 3,652,149 | 3/1972 | Rogers | 350/160 R |
| 3,856,714 | 12/1974 | Moore et al. | 260/2 R |
| 3,864,589 | 2/1975 | Schoot et al. | 313/232 |
| 3,953,874 | 4/1976 | Aviram et al. | 357/8 |
| 4,008,950 | 2/1977 | Chapman et al. | 350/160 R |
| 4,141,236 | 2/1979 | Ellington | 73/11 |
| 4,146,876 | 3/1979 | Arellano et al. | 340/785 |
| 4,183,631 | 1/1980 | Kondo et al. | 350/357 |
| 4,309,082 | 1/1982 | Kohara et al. | 350/357 |
| 4,501,472 | 2/1985 | Nicholson | 350/357 |
| 4,571,029 | 2/1986 | Skotheim et al. | 350/357 |
| 4,573,768 | 3/1986 | Polak et al. | 350/357 |
| 4,773,742 | 9/1988 | Matsuda et al. | 359/275 |
| 4,841,021 | 6/1989 | Katrirzky et al. | 528/407 |

OTHER PUBLICATIONS

J. Am. Chem. Soc. 1983, 105, 4468-4469 "Stategic Design of Organic Conductors Structure of a Prototypical Molecule" James Y. Becker et al.

Chemistry of Materials 1989, I, 412-420, "Structural Trends in Potential Organic Conductors Based on (Donor-CH$_2$)$_2$ Tetracyanoquinodimethane Molecules" J. Y. Becker et al.

Nature, vol., May 1984, pp. 119-123, "Organic Materials" Martin R. Bryce and Lynne C. Murphy.

Accounts of Chemical Research, vol. 12, No. 3, Mar., 1979, "The Difference Between Metallic and Insulating Salts of Tetracyanoquinodimethane (TCNQ): How to Design an Organic Metal" Jerry B. Torrance.

Pure & Applied Chemistry, 15, 109, "Stable Radical Ions" H. Balli et al. 1967.

Top Amer. Chem. 92, 1, (1980) "Two Step Reversible Redox Systems of the Weitz Type" pp. 1-44.

Journal of the American Chemical Society, 95:3, Feb. 7, 1973, "Electron Transfer in a New Highly Conducting Donor-Acceptor Complex" J. Ferraris et al. pp. 948-949.

Solid State Communications, vol. 12., pp. 1125-1132, 1973, "Superconducting Fluctuations and the Peierls Instability in an Organic Solid" L. B. Coleman et al.

Journal Polym. Sci. Polym. Chem. Ed. 1975, 13(1) pp. 9-16 "Novel Polyviologens: Photochromic Redox Polymers with Film-Forming Properties" Myron S. Simon et al.

Chemical Physics Letters, vol. 29, No. 2, Nov. 15, 1974, pp. 277-283 "Molecular Rectifiers", A. Aviram et al.

C & En, Jul. 21, 1936, "The Organic Solid State", pp. 28-45, Dwaine O. Cowan et al.

Mol. Cryst. Liq. Cryst. 1984, vol. 107, pp. 103-113, "TTF-NHCO$_2$(CH$_2$)$_2$O-TCNOBR and TTF-CO$_2$(CH$_2$)$_2$O-TCNQBR, Two Potential Molecular Rectifiers" Charles A. Panetta, et al.

*Primary Examiner*—William Mintel
*Assistant Examiner*—Roy Potter
*Attorney, Agent, or Firm*—Daniel P. Morris

[57] ABSTRACT

An electrochemical color change cell incorporating as a color changing agent intramolecular charge transfer salt or an intermolecular charge transfer salt. The intermolecular charge transfer salts and the intramolecular charge transfer salts have a plurality of oxidation states and a wide variation in color change. The intermolecular and intramolecular charge transfer salts preferably contain a violene moiety and a moiety having a carbonyl group conjugated to an aromatic moiety. The intramolecular charge transfer salts have a stable covalent radical-anion/radical-cation configuration. The intermolecular charge transfer salts have a stable ionic radical-anion/radical-cation configuration.

12 Claims, 8 Drawing Sheets

CHARGE TRANSFER SALTS AND USES THEREOF

This application is a continuation-in-part of first U.S. patent application Ser. No. 07/446,272 filed Dec. 5, 1989, now abandoned, continued under 37 CFR 1.78(a) and a U.S. patent application Ser. No. 07/533,611 filed Jun. 5, 1990, which is also abandoned, the priority of which is retained.

FIELD OF THE INVENTION

This invention relates to intramolecular and intermolecular charge transfer salts and uses thereof in particular in electrochemical color changing cells, in particular this invention relates to electrochemical color changing cells wherein the color changing agent is selected from the intramolecular and intermolecular charge transfer salt.

BACKGROUND OF THE INVENTION

Electrochemical display devices of various types are generally well known and have come into extensive use in products such as digital display watches and video game display panels. Typically, the display effect in such devices is achieved by changing the electrical potential of a display electrode relative to a counter electrode in the device to cause a film or a fluid filled cell on the display electrode to electrochemically change color. Such electrochemical display devices are superior to either the type of emitting diode or plasma display panels that preceded them in development, because they require substantially less power to achieve the display function. While liquid crystal display devices have been developed with lower power requirements than those of light emitting diodes and plasma display panels, they have other inherent disadvantages. For example, the visual effect achievable from liquid crystals is severely limited by the viewing angle, i.e. if viewed from an angle several degrees away from an axes orthogonal to the plane of the display surface the visibility of this display is significantly decreased. Also, liquid crystal displays have essentially no residual memory function within the liquid materials.

In the earliest electrochemical display devices, a color change was typically affected between a single dark color and a white or yellowish color, but no other variations in color were achievable. The electrochemical color change cells of the present invention have a wide color variation.

Electrochemical display devices are expected to have a bright future since the color of indication is brilliant, necessary voltage and current are small and there is no restriction on the observation angle.

Applicants have discovered unique types of electrochemical compounds. Applicants have synthesized an intramolecular charge transfer salt (which is described herein below) having multiple oxidation states which also shows a wide variation in color change and wide variation in the ultraviolet absorption. Applicants have also discovered for the first time intermolecular charge transfer salts (which is described herein below) including as an acceptor, a constituent, having a carbonyl group conjugated to an aromatic moiety.

An intramolecular charge transfer salt is a covalent compound containing a moiety having a negative charge and an unpaired electron (radical-anion) and moiety having a positive charge and an unpaired electron (radical-cation) on the same molecule. An intramolecular charge transfer salt is schematically represented in FIG. 15. Covalent compound 220 has a moiety 222 which has a negative charge and an unpaired electron 224. Moiety 222 is the radical-anion. Covalent compound 220 has a moiety 226 which has a positive charge and an unpaired electron 228. Moiety 226 is the radical-cation. The article in J. Am. Chem. Soc. 1983, 105, 4468–4469 to J. Becker et al. and the article in Chemistry Of Materials, 1989, 1, 412–420 to J. Becker et al. describe expected benefits of intramoleculer charge transfer salts and reports some experimental data on a model system. However, the articles of Becker et al. do not teach or suggest the synthesis of an intramolecular charge transfer salt.

In recent years there has been an extensive amount of work on intermolecular charge transfer salts. This work is reviewed in the following articles; NATURE Vol. 109 May, 1984, p. 119, entitled "Organic Metals" to Bryce et al.; Accounts of Chemical Research, Vol. 12, No. 3, March, 1979, J. B. Torrance; The Organic Solid State, Jul. 21, 1986, C & EN p. 28, D. O. Cowan et al. The most highly studied intermolecular charge transfer salts are salts of TCNQ (tetracyano-p-quinodimethane), in particular the intermolecular charge transfer salt of TCNQ with TTF (tetrathiafulvalene). The TTF-TCNQ salt shows metallic-like conductivity. The prior art, however, does not teach nor suggest an intermolecular charge transfer salt including a compound having a carbonyl group conjugated to an aromatic moiety as an electron acceptor constituent. As used herein, an electrical conductor includes a material which is a semiconductor and a metallic conductor.

An intermolecular charge transfer salt is schematically represented in FIG. 16. Ionic compound 230 has anionic constituent 232 which has a negative charge and an unpaired electron 234. Constituent 232 is the radical-anion. Ionic compound 230 has cationic constituent 236 which has a positive charge and an unpaired electron 238. Constituent 236 is the radical-cation. Gap 240 schematically represents the absence of a covalent link or bond between the radical-anion constituent 230 and the radical-cation constituent in the ionic compound 230 and indicates the ionic interaction between the radical-cation and radical-anion.

It is an object of this invention to provide an electrochemical color change cell containing an intramolecular charge transfer salt as a color changing agent.

It is another object of the present invention to provide an electrochemical color change cell having as color change agent an intermolcular charge transfer salt containing a constituent having a carbonyl group conjugated to an aromatic moiety.

It is another object of the present invention to provide an intermolecular charge transfer salt compound.

It is another object of the present invention to provide intramolecular charge transfer compound containing a constituent having a carbonyl group conjugated to an aromatic moiety.

These and other objects, features and advantages of the present invention will be readily apparent to those of skill in the art from the following more detailed description of the preferred embodiments and the figures appended thereto.

SUMMARY OF THE INVENTION

A broad aspect of the present invention is an electrochemical color change cell having an intramolecular charge transfer salt as the color change agent.

Another broad aspect of the present invention is an intramolecular charge transfer salt which is a covalent compound capable of having at least one radical-cation moiety covalently bonded to at least one radical-anion moiety.

In a more particular aspect of the present invention, the intramolecular charge transfer salt contains a violene or cyanine moiety and a moiety containing a carbonyl group conjugated to an aromatic moiety.

Another broad aspect of the present invention is an electrochemical color change cell having an intermolecular charge transfer salt containing a constituent having a carbonyl group conjugated to an aromatic moiety as an anionic constituent as color change agent.

Another broad aspect of the present invention is an intermolecular charge transfer salt containing a constituent having a carbonyl group conjugated to an aromatic moiety as an anionic constituent. In another more particular aspect of the present invention, the intermolecular charge transfer salt contains a bisimide anionic constituent and a violene cationic constituent.

DETAILED DESCRIPTION OF THE PREFERRED EMBODIMENT

Figure 1:
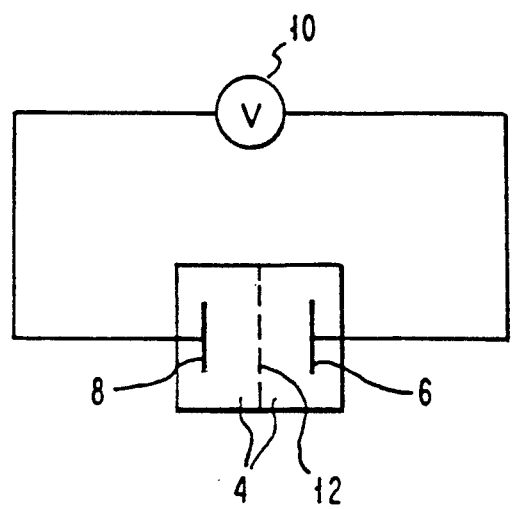
FIG. 1 is a schematic diagram of an electrochemical color change cell according to the present invention.

As shown in FIG. 1 in a container 2, at least a part of which is transparent, for example, of glass, clear plastic and the like, which contains electrochromic substance 4, a solution in the liquid phase, gel phase or solid phase, a pair of chemically stable electrodes, namely, an indication electrode 6 and a counter electrode 8 disposed within container 4 with a specific gap between electrode 6 and 8. In the preferred embodiment the gap between electrodes 6 and 8 was filled with an electrochromic solution 4. However, electrochromic displays can be formed with polymeric materials and solid materials as described in U.S. Pat. No. 4,571,029 to Skotheim et al. the teaching of which is incorporated herein by reference and in U.S. Pat. No. 4,573,768 to Hirai, the teaching of which is incorporate herein by reference. The electrodes 6 and 8 are connected to a variable DC power source 10 to control the potential between electrodes 6 and 8 and thereby the color of the electrochromic cell of FIG. 1. Optionally the electrochromic cell can have a separator 12 between the indication electrode 6 and the counter electrode 8. The separator can be separators commonly used in the art in electrolytic cells, for example, a fritted glass plate (preferably having from 4-8 micron porosity), a salt bridge and a semipermeable membrane, for example, a film of Nafion ® DuPont. U.S. Pat. No. 4,183,631 to Kondo et al. teaches an electrochromic display device using a separator. The teaching of Kondo et al. is incorporated herein by reference. U.S. Pat. No. 4,141,876 to Arenallo et al. is an example of an electrochromic display cell not using a separator. The electrochemical cell which is schematically shown in FIG. 1 can be used in the electrochromic devices of U.S. Pat. Nos. 3,864,589; 4,146,876; 4,008,950; 4,141,236 and 4,501,472 described herein below the teaching of each of which is incorporated herein by reference.

Electrochemical displays are known in which a plurality of separate segments or display elements are individually energized to provide a desired display characteristic. Such an arrangement is disclosed in U.S. Pat. No. 4,008,950 to Chapman et al. The Chapman display contains individually sealed cavities which contain an electrochemical fluid. Each display element is individually controlled by a pair of electrodes in contact with the fluid within each cavity.

U.S. Pat. No. 3,864,589 to Schoot et al. describes an electrochemical display device in which an elongated horizontally extending electrochemical fluid cavity is provided for each of a plurality of electrodes. A plurality of vertically oriented, horizontally spaced individual display element cavities extend in communication with each elongated fluid cavity and electrodes are provided to form a matrix display in which individual electrochemical filled cavities extend between a matrix of row and column electrodes but with each of the individual cavities extending into communication with the elongated horizontally extending fluid cavity so that all individual cavities can be filled by filling a small number of elongated row cavities. This arrangement provides coincident matrix selection of the individual display elements to reduce the complexity of the electrical drive circuit by eliminating the need for a separate individually controlled electrical connection for each display element.

U.S. Pat. No. 4,146,876 to Arellano et al. describes a matrix addressed electrochromic display which includes a first and second spaced part of opposed plate of panels, a dielectric space of peripherally sealing the panels to provide an interior cavity therebetween to define a display region, an electrochromic fluid filling interior cavity, a plurality of parallel rows and columns of electrodes disposed in the mating surfaces of the first and second panels respectively and a low output impedance electrical refresh circuit coupled to electrically energize the electrodes in a repetitive matrix selection pattern to provide a selected dot matrix display.

Electrochromic displays have many other uses for example, in U.S. Pat. No. 4,141,236 to Ellington describes a shock absorber coupled to an integrated circuit to measure the force/velocity characteristic of the shock absorber when the characteristic falls outside a predetermined value, the circuit delivers an electrical output to an electrochromic color change cell to indicate failure of the shock absorber. U.S. Pat. No. 4,501,472 to Nicholson et al. describes a tunable electrochromic filter using an electrochromic cell. The electrochromic cells described in the present invention have a wide variation in color change and are therefore useful as an electrochemically tunable optical filter. Moreover, the electrochemical materials of the present invention have a wide variation of ultraviolet absorption and are therefore useful as a ultraviolet filter.

The preferred electrochemical solutions according to the present invention include an intermolecular charge transfer salt in a solvent. Examples of types of solvents are nitriles, nitro compounds, amides, cyclic amides, amines, esters, cyclic esters, carbonates, oxides and sulfo compounds. This list is exemplary only and not limiting. The following is a exemplarly list of solvents acetonitrile, N,N-dimethylformamide, N-methylformamide, N,N-diethylformamide, N-ethylformamide, N,N-dimethylacetamide, N-methyl-2-pyrrolidone, hexamethylphosphoramide, propylene carbonate, ethylene carbonate, $\gamma$-butyrolactone, dimethylsulfoxide, acetone, sulfolane, water and alcohols.

In addition, the electrochemical solutions will include in the solution a supporting electrolyte and preferably a supporting electrolyte salt that contains as cation a member from one of the following groups: tetraalkylammoniu, tetraalkylphosphonium, alkali metal, aryl-alkylammonium, aryl-alkylphosphonium, or chelated metal. The preferred tetraalkylammonium group is tetrabutylammonium, but other tetraalkyls with alkyl group being methyl, ethyl, propyl, isopropyl, pentyl, hexyl, or mixed alkyl thereof can be employed if desired. An example of a typical aryl group is phenyl and an aryl-alkylammonium is benzyltributylammonium. An example of a chelated metal cation is potassium 18-crown-6. The supporting electrolyte salt preferably contains as anion one of the following: tetrafluoroborate, hexafluorophosphate, aryl sulfonate, perchlorate, or halide such as bromide or iodide.

Because organic charge transfer salts contain redox couples they are candidates for color active agents in electrochromic devices. Organic charge transfer salts have been of interest in recent years, since the discovery of the metallic conductivity of the TTF-TCNQ ionic intermolecular charge transfer salt, as reported in J. Am. Chem. Soc. 1973, 95, 948–949 by Ferraris et al. and in Solid State Commun. 1973, 12, 1125–1132 by Coleman et al.

The TCNQ radical anion forms organic semiconductors with a large number of cations. For example, $K_+$ and N-methylquinolinium ($NNQn^+$) salts with TCNQ have room temperature conductivities $\simeq 5 \times 10^{-4}$ and $\simeq 10^{-6}$ $ohm^{-1} centimeters^{-1}$ respectively. The cations in these intermolecular or ionic charge transfer salts are electron donors.

TCNQ has been found to form a few compounds with conductivities as high as $10^{+2} ohms^{-1} cm^{-1}$. Many of these salts have a 1:2 ratio of cation to TCNQ, such as $Et_3NH-(TCNQ)_2$, but a few form 1:1 salt. A primary example is N-methylphenazinium, NMP-TCNQ.

Figure 12:
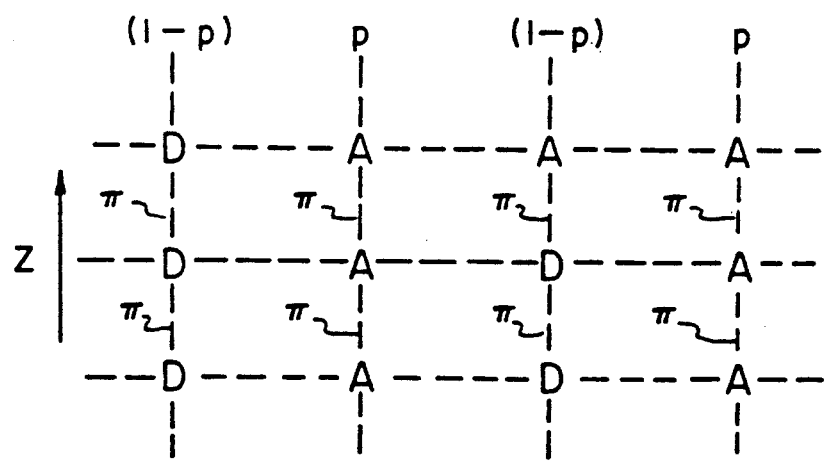
FIG. 12 is a diagrammatic representation of a crystallized compound with donor and acceptors in a segregated stacked configuration.

Substantial increase in the conductivity of intermolecular TCNQ salts was discovered in the prior art. It was found that the high conductivity is associated with crystal structures in which the intermolecular TCNQ salts are packed face to face, like a deck of playing cards, with segregated stacks of cations and TCNQ anions. FIG. 12 schematically shows such a stack where D represents the donor or cation and A represent the acceptor or anion. In an intermolecular charge transfer salt the dashed lines in FIG. 12 represent an ionic interaction between discrete cations and anions. In an intramolecular charge transfer salt the dashed line represents covalent bonding between the donor and acceptor parts of a covalently linked molecule.

The $\pi$-overlap and charge-transfer interaction between adjacent molecules in the stacking direction z are strong, causing therein unpaired electrons to be partially delocalized along one of these one dimensional molecular stacks and enabling them to conduct in that direction. The $\pi$-bonds are represented in FIG. 12 by the dotted lines between the stacked D's and the stacked A's. Between adjacent donor and acceptor molecules there is a transfer of charge. The donor molecule transferring either an entire electron or a fractional part of an electron to the acceptor. In FIG. 12 the degree of electron transfer is designated by the symbol $\rho$, which has a value between 0 and 1. For a value of $\rho$ equal to 0 there is no transfer of an electron from the donor to the acceptor. For a value of $\rho$ equalling to one there is complete transfer of an electron to the acceptor. For a value of $\rho$ between 0 and 1 there is partial transfer of the electron from the donor to the acceptor.

The overlapping $\pi$ bonds between adjacent donors and between adjacent acceptors form energy bands in similar fashion to an energy band in solid state materials. When $\rho$ is either 0 or 1 for a crystallized material represented by FIG. 12 the material has energy bands either completely filled or completely empty of electrons and is therefore, either an insulator or semiconductor depending upon the energy separation between the highest completely filled energy band and the lowest completely empty energy band. When $\rho$ has a value between 0 and 1 which corresponds to partial electron transfer the highest energy band which contains electrons is generally partially filled and therefore corresponds to a metallic like conductor.

In an article in J. Am. Chem. Soc. 1983, 105, 4468–4469 to Becker et al., the potential benefits of an intramolecular charge transfer salt over an intramolecular transfer salt have been described. However, Becker does not describe the actual synthesis of an intramolecular charge transfer salt.

The benefits of an intramolecular charge transfer salt as pointed out by Becker et al. is to design efficient organic conductors which are composed of donor (D) and acceptor (A) moieties by achieving the following necessary conditions; (a) enforce a segregated mode of stacking (... DD ... || ... AA ... ) in the solid state; (b) control the D:A stoichiometry; (c) encode ab initio the desired degre of electron transfer ($\rho$) into the molecular unit; (d) stabilize the delocalized state, ... $D^{\rho+}D^{\rho+}$... || $A^{\rho-}A^{\rho-}$..., below the localized ones, e.g., ... $D^+D$... || $A^-A$... ); (e) permit and control the degree of interchain coupling. Becker points out that the systematic control of these conditions will allow the preparation of organic conductors with pre-designed properties. In the conditions (a) and (d) the segregated mode stacking is shown as ... DD ... this represents the vertical stack of D's in FIG. 12. Also, the ... AA ... represents the vertical row of A's in FIG. 12. The double vertical lines separating the D's and the A's corresponds to the bonding between the D's and the A's, shown in FIG. 12 as a dotted line.

Becker et al. refers to an archetypal molecular unit Dm-An which contains both donor and acceptor moieties in a prefixed stociometric ratio (n:m), which is potentially endowed with the necessary properties that can be calculated to meet the requirements of conditions b to d above.

Becker reports a model archetypal molecular unit, 2,5-dibenzyl-7,7,88-tetra-cyano-p-quinodimethane (DBTCNQ). Becker points out that this molecule contains a weak donor (e.g. phenyl), and that this material was expected not to be a ground state conductor. Becker further points out that this compound shows promise for the strategy underlined in criteria (a)–(e). Therefore it is clear from the teaching that Becker has not fabricated an intramolecular charge transfer salt.

The model compound of Becker consists of two benzene rings linked to a TCNQ acceptor. The reason why this compound is not an intramolecular charge transfer salt is that the reduction potential of the benzene radical-cation is too positive relative to the reduction potential of the TCNQ moiety. This means that it is not energetically favorable to transfer an electron from the benzene ring to the TCNQ moiety. The potentials in question are:

Reference: "Electrochemical Methods" by A. J. Bard L. R. Faulkner. John Wiley and Sons, New York, 1980.

Reference: W. C. Neikam, et al., J. Electrochem. Soc. 111, 1190 (1964).

In other words if it were possible to prepare the Becker et al. molecule as the radical-cation/radical-anion, it would immediately go back to the uncharged state because the TCNQ radical-anion is almost 2 V more strongly reducing than is the neutral phenyl ring. The redox potential of a toluene is used instead of the potential for a benzene ring since toluene is a better match for the substituted in benzene in the Becker molecule.

Figure 13:
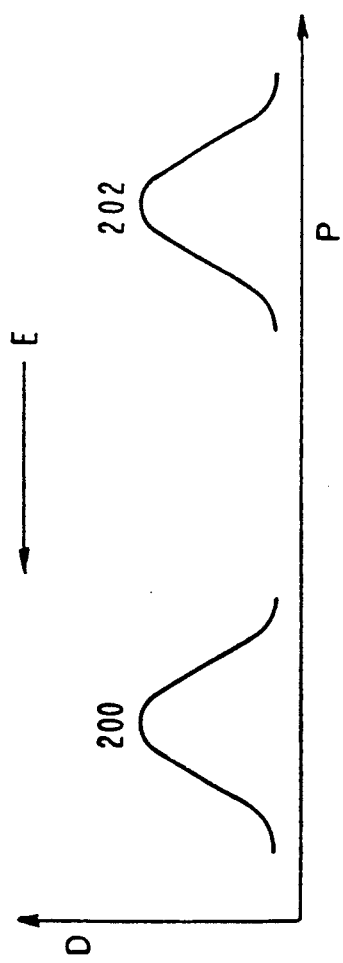
FIG. 13 is a diagrammatic representation of non-overlapping redox couples.
Figure 14:
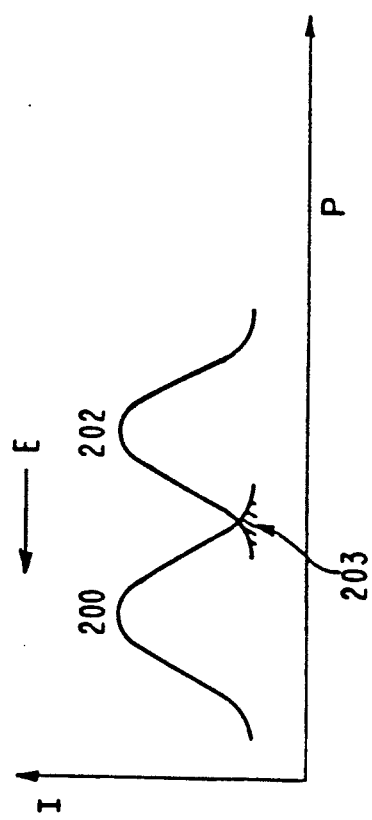
FIG. 14 is a diagrammatic representation of overlapping redox couples.

FIG. 13 and FIG. 14 are schematic representations of the relationship of the redox potentials of the donor and acceptor moieties of an intermolecular charge transfer salt and an intramolecular charge transfer salt. FIG. 13 shows two peaks on a plot which represent two distinct redox couples. The vertical axis is an arbitrary scale of density of electronic states. The horizontal axis is an arbitrary scale of electric potential (the scale of energy E is also indicated). Since E is equal to $-|e|$ P, the energy scale is inversed to that of the potential scale. A redox couple is an energy location on a molecule which is capable of reversibly receiving or giving up an electron. For an intramolecular charge transfer salt the redox couples 200 and 202 would be different moieties on the same molecule. For an intermolecular charge transfer salt the redox peaks 200 and 202 would represent redox couples on different molecules. The redox couple on each molecule has a molecular orbital with an energy level into which the electron is deposited. The spreading in the energies of the redox couples 200 and 202 arises because in a collection of molecules each electron is added to a molecular orbital of a distinct molecule. Energies of the remaining unoccupied molecular orbitals of other molecules are affected by the filled molecular orbitals and increase in energy. This causes the spread in energy of the redox couples. If redox couple 200 represents a collection of molecules containing an electron in the redox couple these molecules are potential donors. Assuming that the redox couples 202 are unoccupied by electrons since they are at a potential more positive than the redox couple 200 or in other terms at a lower energy than the redox couple 200 the electrons in the redox couple 200 can transfer to the redox couple 202. This corresponds to complete electron charge transfer referred to herein and above. If redox couple 202 is completely occupied with electrons and redox couple 200 is completely empty of electrons, since redox couple 202 is at a potential more positive of redox 200 or in other words since redox couple 202 is at a lower energy level than redox couple 200 electrons in redox couple 202 will not transfer to redox couple 202. This corresponds to the condition of no electron transfer referred to herein and above.

FIG. 14 represents the condition where the redox couples 200 and 202 overlap which is indicated by the shaded region 203 in FIG. 14. If redox couple 200 is completely filled with electron and redox couple 202 is completely empty, redox couple 200 represents a potential electron donor. Since redox couple 202 is at a potential more positive than redox couple 200 the electrons in redox couple 200 can transfer to redox couple 202. However, because of the overlap region 204 electrons can remain in redox couple 200. This corresponds to the condition of partial electron transfer since the electron can occupy both redox couples 200 and 202. For the condition where redox couple 202 is filled with electrons and redox couple 200 is completely empty of electrons, redox couple 202 is a potential electron donor. However, since redox couple 202 is at a potential more positive of redox couple 200 most of the electrons remain in redox couple 202. However, because of the overlap region 203 the electrons can occupy redox couple 200. This also corresponds to the condition of partial electron transfer. The degree of partial electron transfer depends upon the amount of overlap of the couples 200 and 202.

The applicants are the first to synthesize an intramolecular charge transfer salt for which it is contemplated that partial electron transfer between an electron donor moiety and an electron acceptor moiety on the same covalent molecule can be achieved in the solid and polymeric to form ionic, semiconducting and metallic state. For the sake of clarity, synthesis of, and use of the intramolecular charge transfer salt will be described in terms of a preferred embodiment containing a viologen donor and an aromatic bis-imide acceptor, which has five distinct oxidation states and four redox couples which has a corresponding wide variation in color change which makes it useful for electrochromic display devices. The synthesis can generally be described as reacting a monoalkylated viologen with an unsymmetrical bis-imide containing a leaving group suitable for undergoing a displacement reaction. The bis-imide is preferably in excess, most preferably 0.5M excess. It is contemplated that this method can be generalized to violenes and cyanines and to compound having an carbonyl group conjugated to an aromatic moiety. It will be readily apparent to the artisan that this method generalizable to violenes and cyanines reacted with compounds having a carbonyl group conjugated to an aromatic moiety. Generally, organic molecules having multiple redox couples show multiple color variation on electrochemically populating and depopulating redox couples. The viologen bis-imide intramolecular compound described herein is unusual in that it has five oxidation states permitting a very wide variation in color change. Applicants have also discovered that an electrolyte solution containing a compound having a viologen moiety and containing a compound having a bis-imide moiety when there is no covalent link between these two molecules also shows five oxidation states which also shows a very large variation in color change. The violene, family of compounds is described in Pure Appl. Chem. 1967, 15, 109–122 to Hunig and in Top. Curr. Chem. 1980, 92, 1–44 to Hunig et al. The teachings of both of the Hunig articles are incorporated herein by reference. Violenes are preferred. The most preferred donor embodiment is a viologen which is a member of the violene family of compounds. The most preferred viologen is ethyl viologen which has the following structural formula where $I^-$ is an iodide ion

21⁻

The bis-imide material of this preferred embodiment is N,N'-dibutylpyromellitimide which has the following structural formula where Bu=n-butyl or $CH_3CH_2CH_2CH_2$ in Compound 15:

The violene family of compounds exist in three distinct oxidation states and therefore has two redox couples. The bis-imides also have three distinct oxidation states and therefore two redox couples. The combination of the violene and bis-imide either in a covalent linked compound or in an intermolecular ionic compound shows five oxidation states and four redox couples.

The linked compound has the following structural formula where $OMS=CH_3SO_3\ominus$ or mesylate ion or methylsulfoxy ion in compound 16:

The various oxidation states of the violene and bis-imide family of compounds are based on their complementary charges and on the overlap of their reduction potential as shown in the Table for ethyl viologen (14) and N,'N-dibutylpyromellitimide (15). As can be seen from the Table there is an overlap in the reduction potentials of compounds 14 and 15. Such an overlap in reduction potential can lead to partial electron transfer as described herein above which can lead to electrical conductivity in the solid state.

TABLE

| Reduction Potential for 14 and 15 | | |
|---|---|---|
| Compound | $^1E_{\frac{1}{2}}$ | $^2E_{\frac{1}{2}}$ |
| 14 | −0.370 | −0.752 |
| 15 | −0.685 | −1.392 |

Reduction potentials measured by cyclic voltammetry vs. SCE at 0.5 mM in DMF/0.1 M Bu₄NBF₄.

Figure 2:
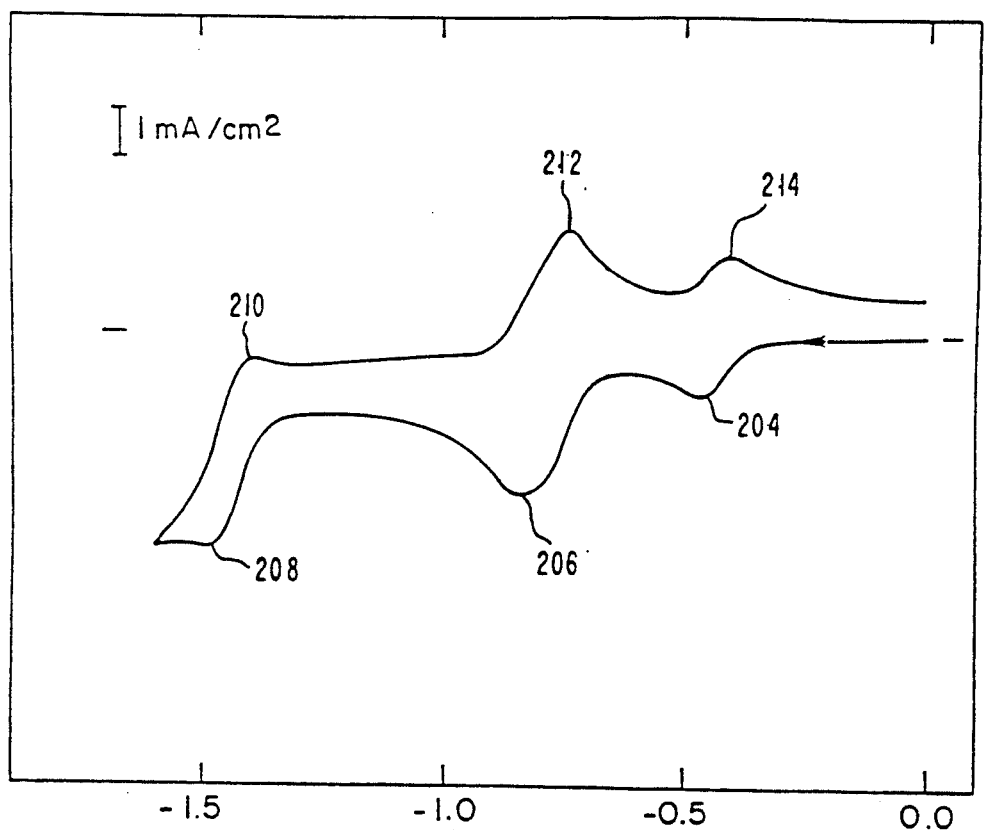
FIG. 2 is a cyclic voltammogram of a 1.0 mM solution of compound at 0.05 mM in N,N-dimethylformamide (DMF) with 0.1M tetrabutylammonium tetrafluoroborate (Bu$_4$N BF$_4$) at 50 mv/sec. Voltages are vs. SCE.

The following sequence of equations represents the reversible addition of four electrons to the linked compound 16. The color of each oxidation state is listed. The $X^-$'s and $M^+$'s are counterions to provide local charge neutrality. FIG. 4 and FIGS. 6 to 10 show UV-VIS (ultraviolet visible spectroscopy) spectra or corresponding to the stages of reduction of linked compound 16 as it accepts a total of four electrons. FIG. 2 is a CV (cyclic voltammegram) of the compound of equation 16. The CV and UV-VIS are measurements commonly practiced in the art. M+ is Bu$_4$N+ or Et$_4$N+ (i.e. tetraalkylammonium ion 5) X− is OMs− or I− or BF$_4$−.

insufficient to electrolyze the electrolyte. The voltage is then ramped back to 0. The lower part of the curves corresponds to the reduction of the redox couple or

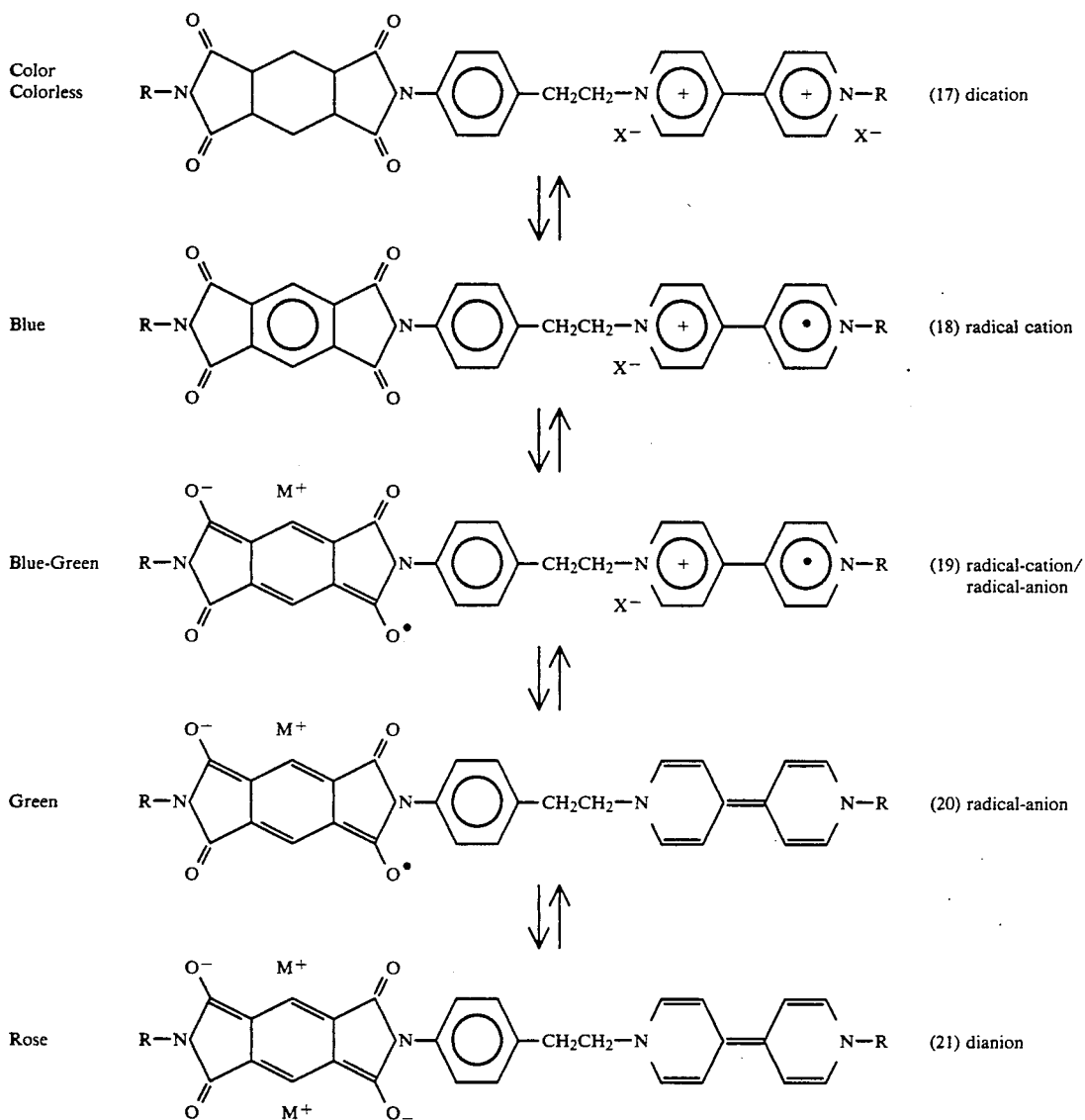

Figure 5:
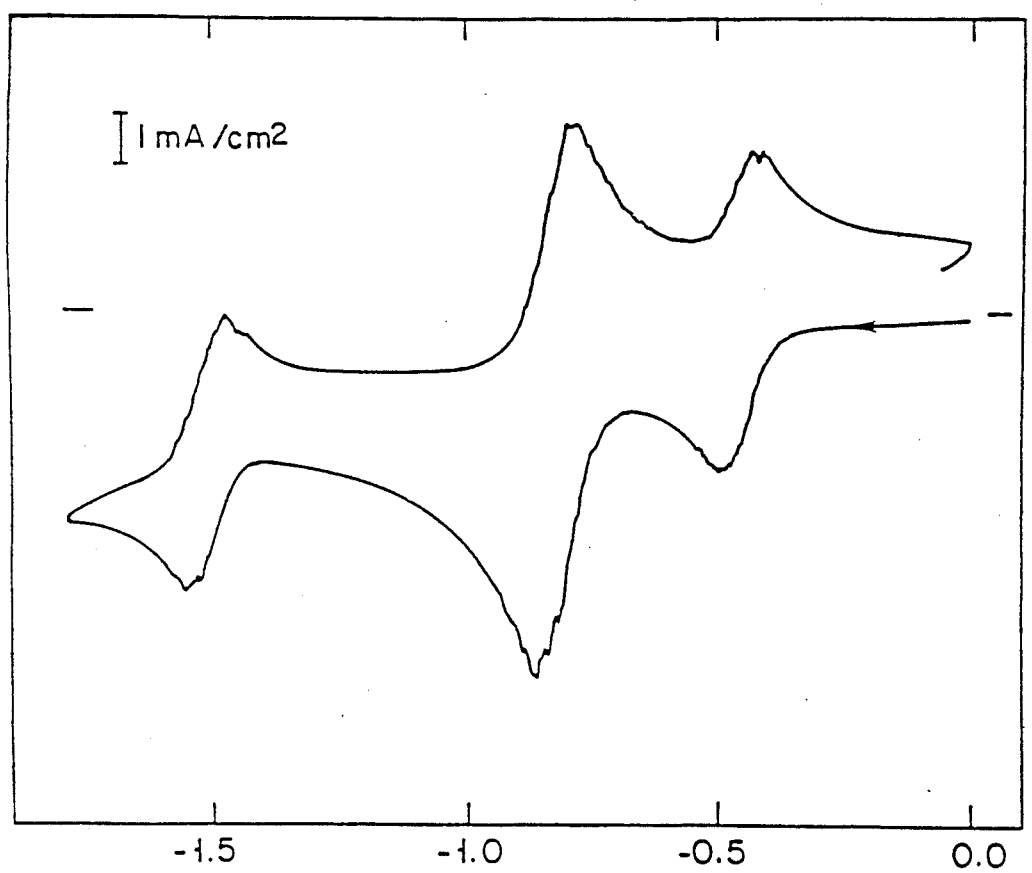
FIG. 5 is the cyclic voltammetry of an equimolar mixture of 14 and 15 each 1.1 mM in DMF with 0.1M Bu$_4$NBF$_4$ at 200 mV/sec. Voltages are vs. SCE.
Figure 6:
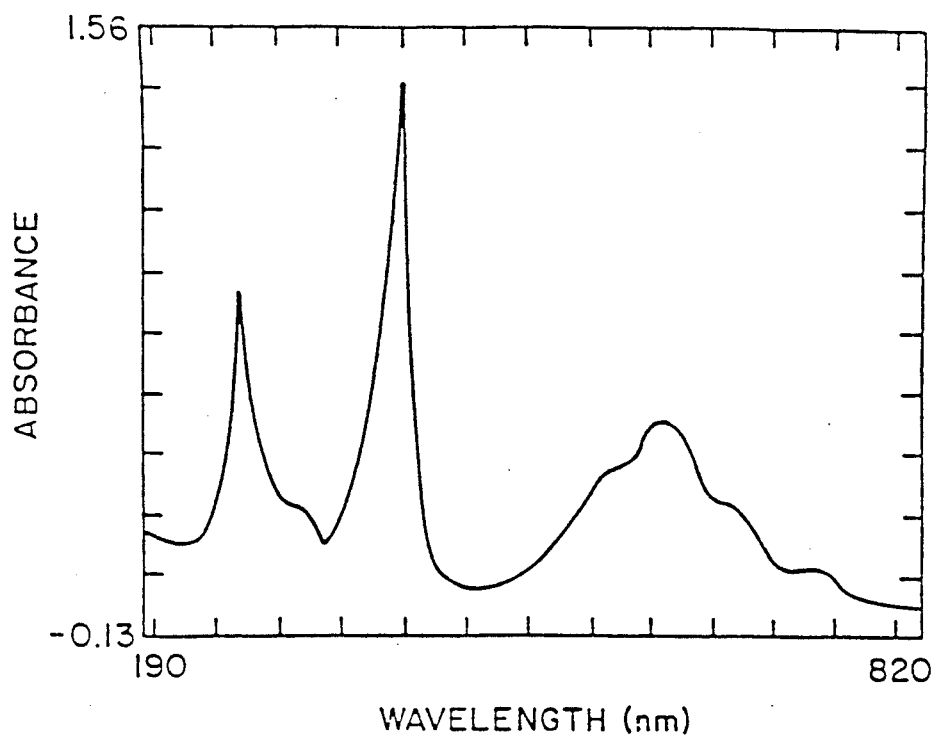
FIG. 6 is a UV-VIS spectra of 0.05 mM of compound 16 in DMF with 0.1M Bu$_4$NBF$_4$ recorded after bulk electrolysis to $E_{soln} = -0.6$ V.
Figure 7:
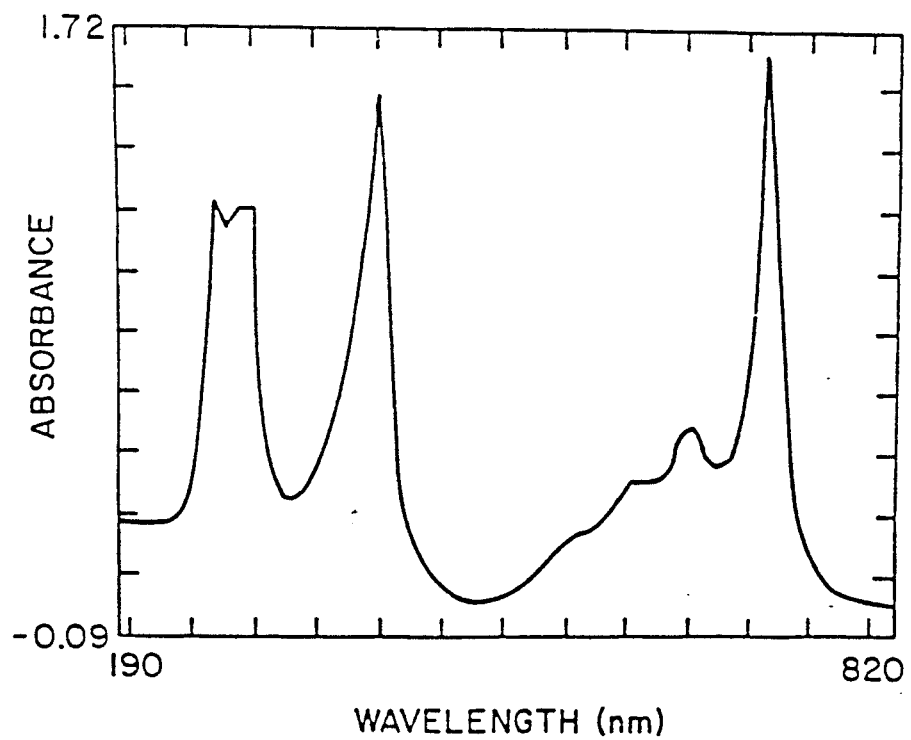
FIG. 7 is the UV-VIS spectrum of compound 16 in the same solution as for FIG. 6 a $E_{soln} = -0.75$ V.
Figure 8:
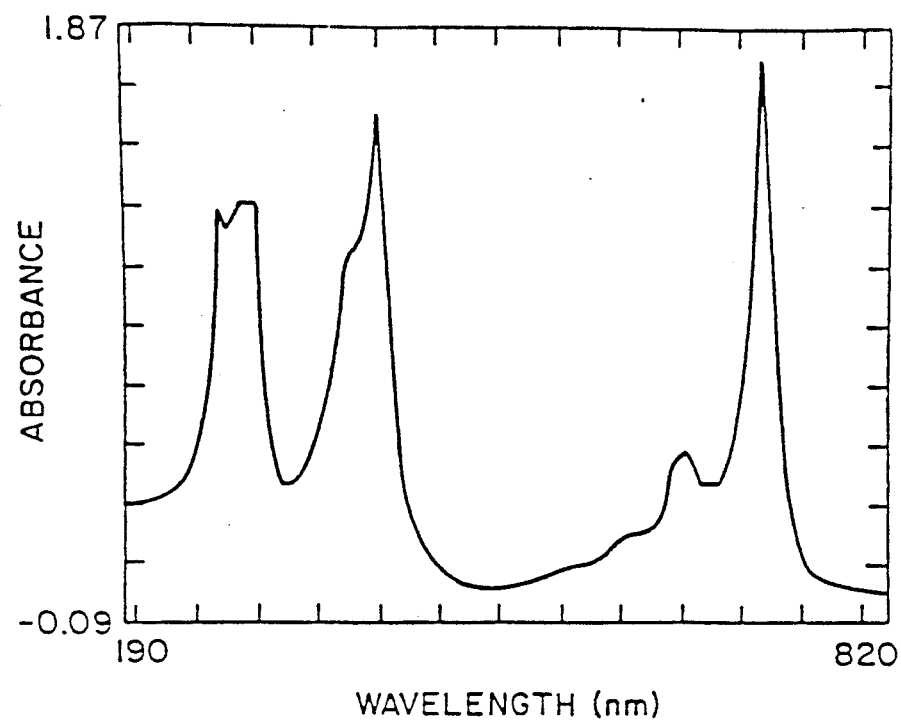
FIG. 8 is the UV-VIS spectrum of compound 16 (in the same solution as for FIG. 6) at $E_{soln} = -0.79$ V.
Figure 9:
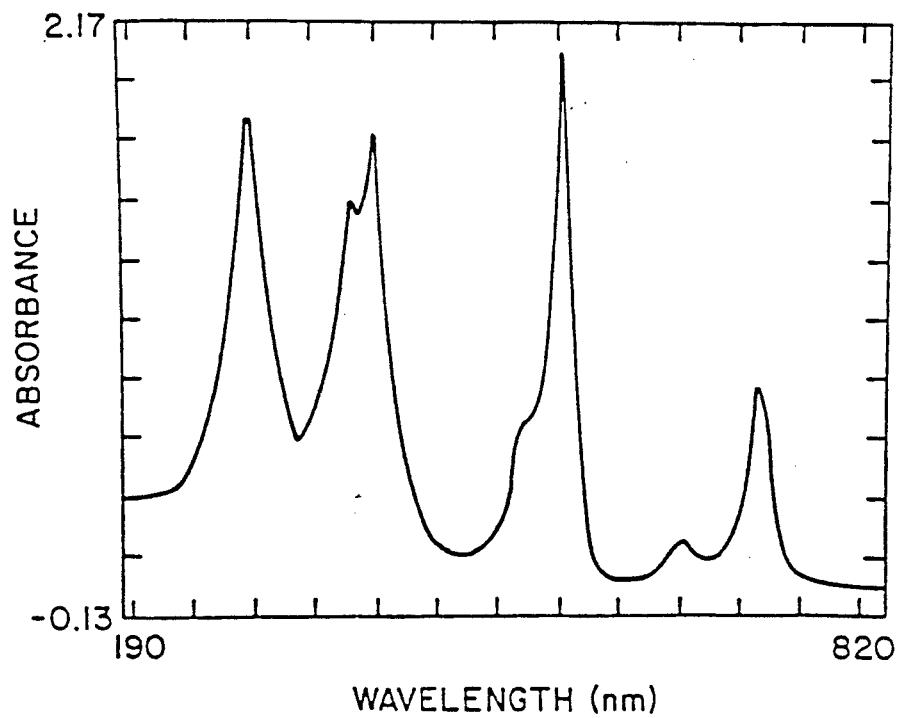
FIG. 9 is the UV-VIS spectrum of compound 16 (in the same solution as for FIG. 6) at $E_{soln} = -1.40$ V.
Figure 10:
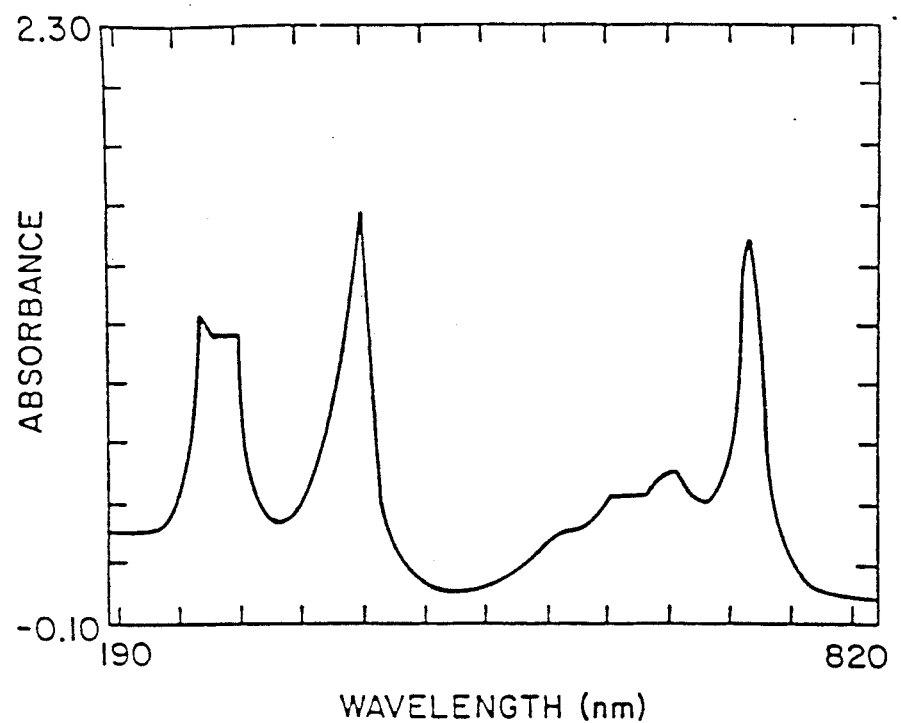
FIG. 10 is the UV-VIS spectrum of compound 16 (in the same solution as for FIG. 6) after re-oxidation to $E_{soln} = -0.73$ V.

A molecule in which both moieties 14 and 15 are incorporated would first add, under reduction conditions, an electron to the viologen unit, generating a radical-cation. Then, because the reduction potential for adding a first electron to the imide is 67 mV more positive than that for adding another to the viologen, the second electron would reduce the imide unit leading to a radical-cation/radical-anion. This has been explored using cyclic voltammetry (CV) and by bulk electrolysis monitored spectroscopically. Both the compound 16, in which two moieties are covalently linked and an equimolar mixture of 14 and 15 have been studied. The CV of the linked compound 16 is shown in FIG. 2. The CV for the mixture of compound 14 and 15 is shown in FIG. 5. The CV's for both the linked compound and the mixture can be readily understood as a superposition of the CV of the imide on that of the viologen. In the cyclic voltammograms of FIG. 2 and FIG. 5 the voltage of a working electrode is scanned from 0 volts (vs. SCE) to a negative potential which is adding electrons thereto; the upper part of the curve corresponds to the oxidation of redox couples or extracting the electrons therefrom. Referring to FIG. 2, peak 204 corresponds to the transition from equation 17 to equation 18, peak 206 corresponds to a super position of the transition from equation 18 to equation 19 and from equation 19 to equation 20, peak 208 corresponds to the transition of equation 20 to equation 21, peak 210 corresponds to the transition from equation 21 to equation 20, peak 212 corresponds to the super position of the transition from equation 20 to equation 19 and the transition of equation 19 to equation 18, and peak 214 corresponds to the transition from equation 18 to equation 17. A similar analysis corresponds to FIG. 5. Note that the middle peak 206 and 212 in FIG. 2 and 216 and 218 in FIG. 5 are roughly twice the height of the other two peaks because it is the result of the two redox couples—the first imide reduction and the second viologen reduction—which are not well resolved in the CV.

Figure 3:
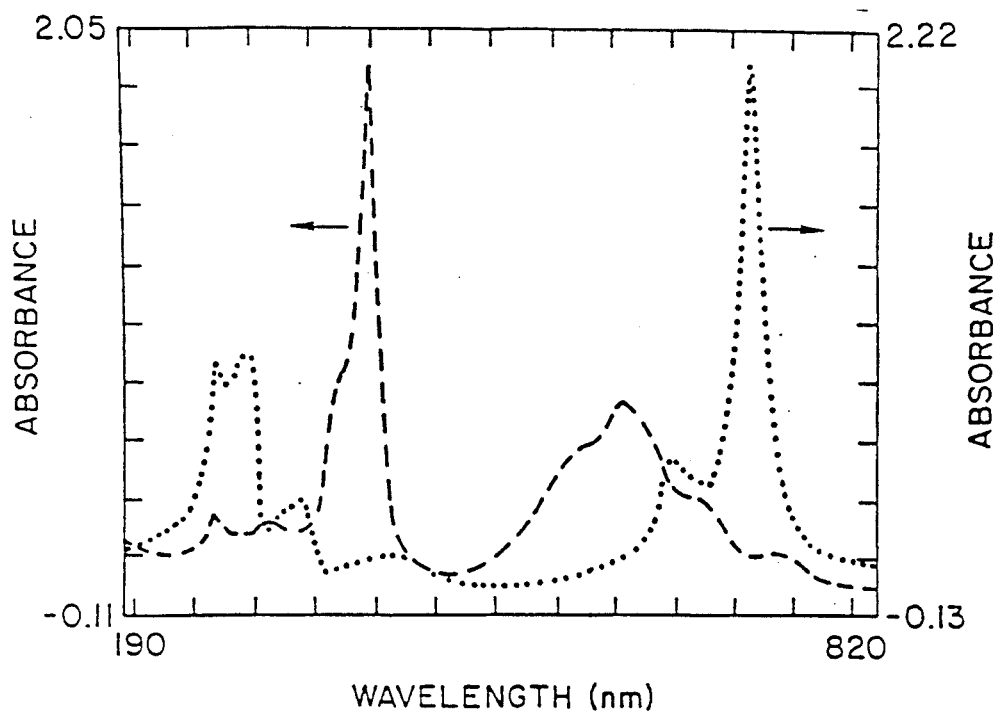
FIG. 3 shows as a dashed curve is a UV-VIS spectra recorded by diode array detection for 0.05 mM of compound 14 in DMF with 0.1M Bu$_4$NBF$_4$ after bulk electrolysis to $E_{soln} = -0.6$ V and shows as the dotted curve a similar solution of compound of equation 15 at $E_{soln} = -1.0$ V.
Figure 4:
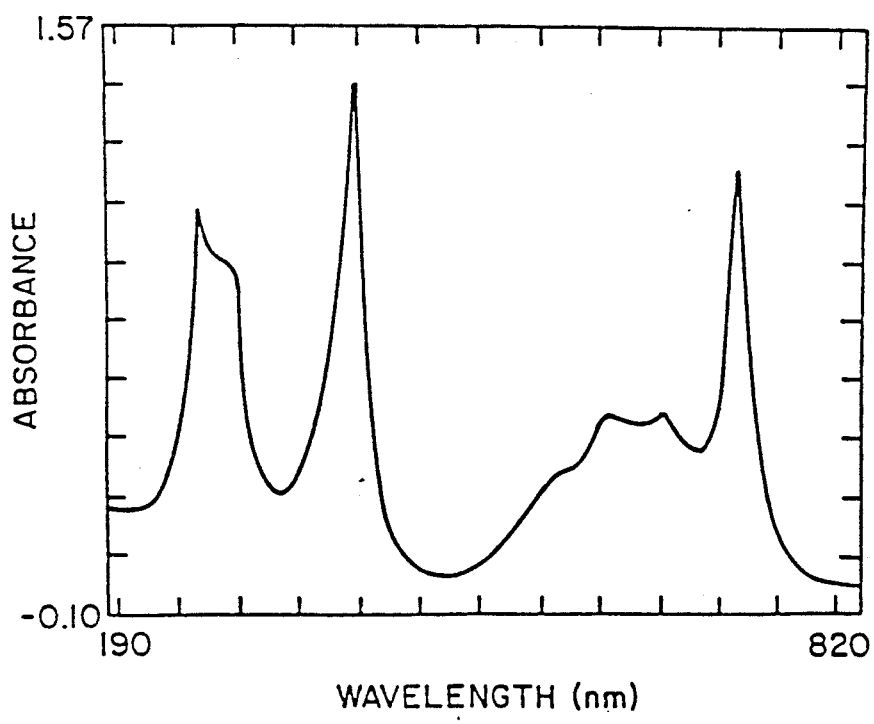
FIG. 4 is a UV-VIS spectra recorded by a diode array detection of compound 16 in DMF with 0.1M Bu$_4$NBF$_4$ after bulk electrolysis $E_{soln} = -0.70$ V.

Bulk electrolysis of compound 16 in dimethylformamide (DMF) was done in a glove box, and samples were removed periodically for UV-VIS spectroscopy. Electrolysis at −0.6 V (vs. standard calomel electrode, SCE) generated the characteristic spectrum of the viologen radical-cations. The solution was then reduced further until a rest potential of $E_{soln} = -0.70$ V was obtained, which resulted in a species showing absorptions for both the viologen radical-cation and the pyromellitimide radical-anion which is shown in FIG. 3. Further electrolysis to $E_{soln} = -0.75, -0.79 -1.40$ V leads first to the disappearance of the radical-cation absorption and then to the appearance of absorptions of the neutral quinoid form of the viologen, then to the disappearance of the pyromellitimide radical-anion absorption in appearance of the dianion absorption. Thus, the electrochemistry of the compound of equation 16 traverses five states: colorless dication, blue radical-cation, blue-green radical-cation/radical-anion, green radical-anion and rose dianion.

The radical-cation/radical-anion is an unusual structure for an organic molecule in its ground state, i.e. a state not populated by a photo excited state. From both the CV and UV-VIS results, it is clear that there is little interaction between the unpaired electrons as might have been predicted from the length and relative rigidity of the aralkyl linkage.

Figure 11:
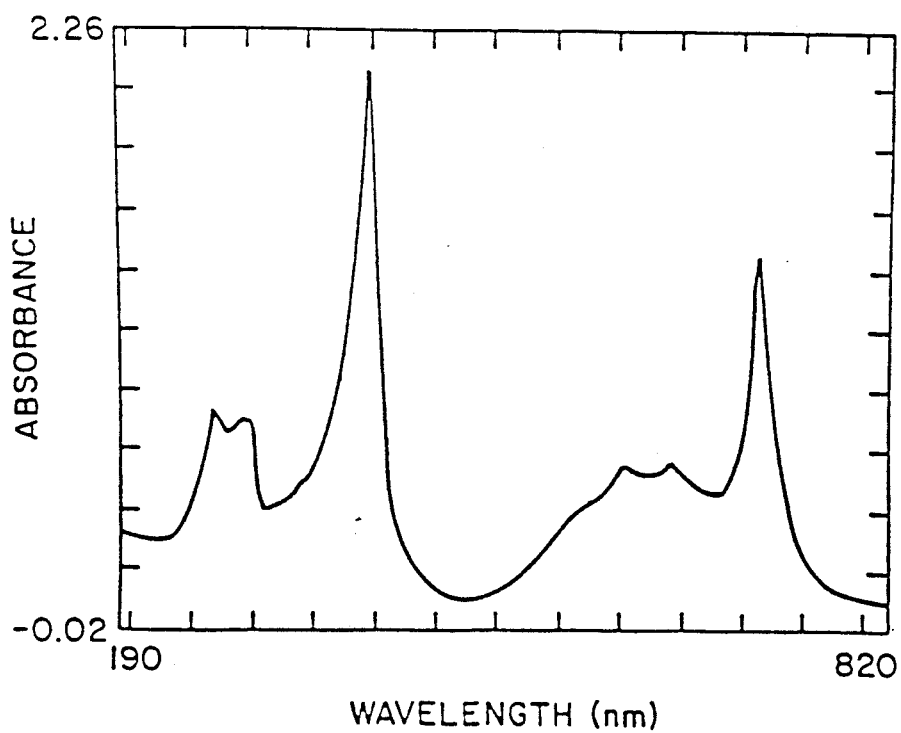
FIG. 11 is the UV-VIS spectrum after bulk electrolysis of 0.05 mM of compound 14 in DMF with 0.1M Bu$_4$NBF$_4$ at $-1.1$ V (complete reduction to neutral form) and addition of equimolar amount of compound 15.
Figure 15:
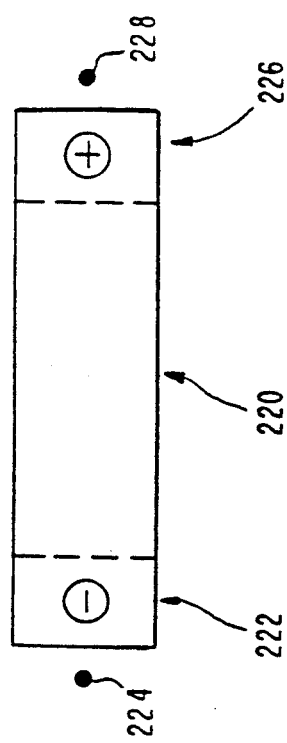
FIG. 15 is a diagrammatic representation of an intramolecular charge transfer salt.
Figure 16:
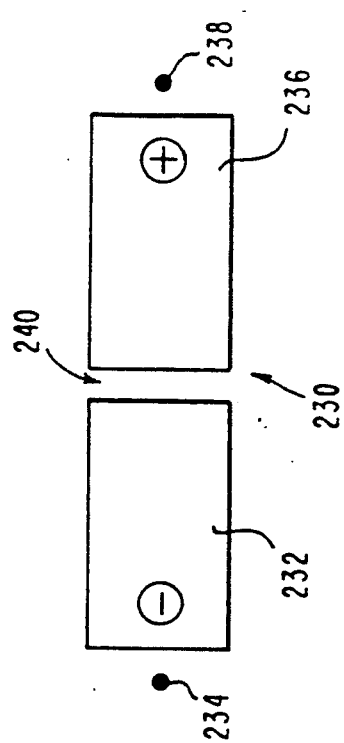
FIG. 16 is a diagrammatic representation of an intermolecular charge transfer salt.

Bulk electrolysis of the viologen 14 was performed until it was completely converted to the neutral form. Under ambient conditions the stable form of the viologen 14 is the dicationic form where the two positive changes are balanced by two anions which in compound 14 is two iodide ions or $2I\ominus$. At this point, addition of an equal or more amount of the un-reduced imide 15 rapidly resulted on a UV-VIS spectrum (as shown in FIG. 11) very similar to that of the doubly reduced form of the compound 16. This is represented by the following equation:

states. The redox potentials as shown in FIGS. 2 and 5 can be adjusted by different structural variations of the donor and acceptor moieties, for example, by forming substituted forms of the donor and acceptor moiety. Adjusting the redox potentials of compounds by forming structural variations are described in Proceedings Of The Symposium On Polymeric Materials For Electronic Packaging and High Technology Applications, Vol. 88-17, The Electrochemical Society Inc.; Pennington, N.J. pp 88-102, (1988) Viehbeck et al., the teaching of which is incorporated herein by reference, and in Metallized Polymers, ACS Symposium Series, American Chemical Society, Washington, D.C., in press exp. June 1990 to Viehbeck et al., the teaching of which is incorporated herein by reference. It is contemplated that such adjustments of the redox potentials can be done to achieve electrically conducting organic polymers in the solid state.

The synthesis of a viologen bis-imide, in particular compound 16, will now be described. Electrochemical reduction of viologen bis-imide (16) led to five distinct redox states that were characterized by cyclic voltammetry and ultraviolet/visible spectroscopy. The ability of a bis-imide to accept one and two electrons to give radical-anion and a dianion, respectively, has been established by Viehbeck et al. as incorporated by reference above. There exists a whole family of compounds whose redox activity is exactly complementary to that of bis-imides. These compounds termed violenes as described above (for example, the dialkylbipyridinium salts) can exist in one of three states: dication, radical cation, and the uncharged state. A compound containing a bis-imide covalently attached to a dialkylbipyridinium salt could therefore exhibit five oxidation states. Of particular interest is the state where one end of the molecule exists as a radical-cation and the other a radical-anion—a highly unusual chemical structure.

Pyromellitimides, in general, are very insoluble in most organic solvents. Thus pyromellitimide 2 was completely insoluble in all organic solvents tried.

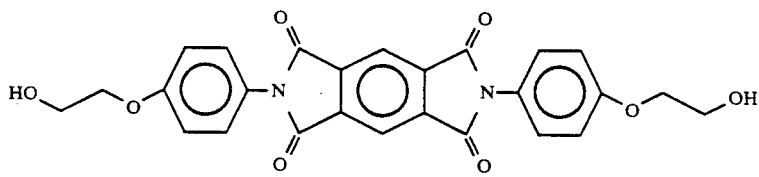

2

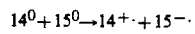

50

By confirming that the radical-cation/radical-anion pair can be generated from the pair of compounds in a neutral state, which are clearly electronic ground states, this last experiment validates the description of the doubly reduced linked compound in a ground state radical-cation/radical-anion. In the sequence of equations 17-21, the bis-imide moiety acts as an acceptor and the viologen moiety acts as a donor. For the purpose of the present application an intermolecular charge transfer salt refers to all the oxidation states as represented by equations 17-21. For the purpose of the present application, an intermolecular charge transfer salt corresponds to a corresponding full sequence of oxidation states for non-linked compounds which corresponds to those of equation 17-21.

The present invention is not limited to five oxidation states but can include many more than five oxidation Solubility of the viologen bis-imide 16 was a key to being able to characterize the molecule electrochemically. To achieve this, we resorted to an unsymmetrical pyromellitimide 3, which has an alkyl imide ring on one side and an aryl imide on the other. A longer chain alkyl, namely a butyl group, was used to help solubilize the planar structure. The aralkyl spacer between the viologen and bissimide provided a semi-rigid spacer to minimize electronic interaction between the two portions of the molecule.

We chose to create the dissymmetry in 3 by a Diels-Alder reaction of N-butyl maleimide and 3,4-dicarbomethoxyfuran, aromatizing the Diels-Alder adduct with dilute acid; and, operating on the ester functionality to incorporate a differently substituted imide. However, aromatizing compound 4 posed tremendous difficulty (Scheme 1). The four electron withdrawing groups in molecule 4 did not support carbocation formation conditions. Hence in spite of its strained structure, 4, was completely resistant even to strong acids. The exo nature of the Diels-Alder adduct also made it impossible to ring open the oxygen bridge using lithium diisopropylamide.

yield in the deoxygenation reported in the article of Wong referred to herein above, on the corresponding tetramethyl ester from 49% to 85%.

Hydrogenolysis of the tetraester 6 proceeded in near quantitative yield to 3,4-dicarbomethoxyphthalic acid 7.

SCHEME 1

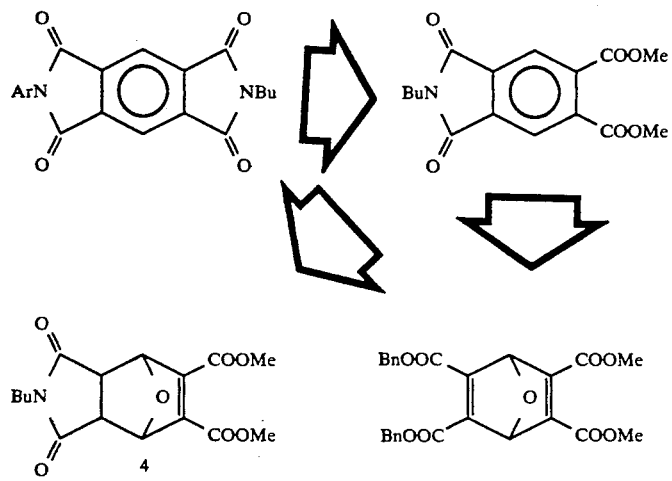

McMurry's deoxygenation methodology, (as described in *Heterocycles* 1983, 20, 1985; Wong, H. N. C., the teaching of which is incorporated herein by reference) using low valent titanium species to deoxygenate 4, produced low yields of the aromatized product. However, the reaction works very well on 1,4 cyclohexadiene systems. We therefore chose molecule 5 as our key intermediate towards the synthesis of the viologen bisimide. The difference in reactivity between benzyl esters and methyl esters was used to create the dissymetry needed in the imide portion of the molecule. Dibenzyl acetylenedicarboxylate was prepared using the procedure described in *J. C. S. Perkin Trans I* 1973, 23, 2024 to G. Low et al. the teaching of which is incorporated herein by reference. The formation of dibenzyl ether in the esterification reaction was minimized by carrying out the distillation of benzyl alcohol rapidly. The dibenzyl has a low flash point. It is therefore recommened to cool the flask to room temperature before introduction of air into the system. The Diels-Alder reaction of dibenzyl acetylenedicarboxylate and 3,4-dicarbomethoxyfuran proceeded in a respectable yield of 50% (5). Deoxygenation of 6 using the McMurry's reagent (TiCl$_4$/LAH/NEt$_3$) in dimethoxyethane (DME) led to a 60% yield of the pyromellitic tetraester 7. Using THF as the solvent led to considerable poly-THF formation under the reaction conditions. Thus changing the solvent from THF to DME raised the Acetic anhydride reflux of the phthalic acid 7 led to the formation of 3,4-dicarbomethoxyphthalic anhydride, 8, in a 75% yield. Imidization of the anhydride 8 had to be done with distilled butylamine and purified 8 used in an exact 1:1 ratio. Excess butylamine reacted with the esters under the imidization conditions to give the bisbutyl imide. The methyl esters were then cleaved using LiI in pyridine to the diacid 10 in a near quantitative yield. Using pyridine as the solvent which reacted with the methyl iodide formed in the reaction, forced the reaction in the forward direction leading to the high yield. The diacid was then dehydrated with acetic anhydride to give the anhydride 11. The second imidization with 4-aminophenethyl alcohol proceeded smoothly to yield 3 (67%). The alcohol 3 was then converted to the mesylate 12 in spite of its sparing solubility in methylene chloride and most other solvents, using a dilute solution of the alcohol in methylene chloride and standard conditions for the reaction.

Monoethylbipyridinium iodide was made by refluxing bipyridyl hydrate with ethyl iodide in acetonitrile as described in *Tetrahedron*, 1981, 37, 4185 to I. Tabushi et al. the teaching of which is incorporated herein by reference. The final step in the synthesis, the displacement reaction of the mesylate in 12 by the nitrogen in the monoethylbipyridyl iodide, required a 0.5 mole excess of the mesylate in order for the reaction to go to completion. The yield on the last step was 65%.

SCHEME 2

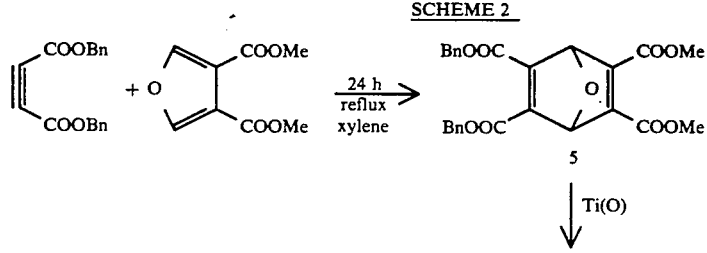

SCHEME 2 -continued

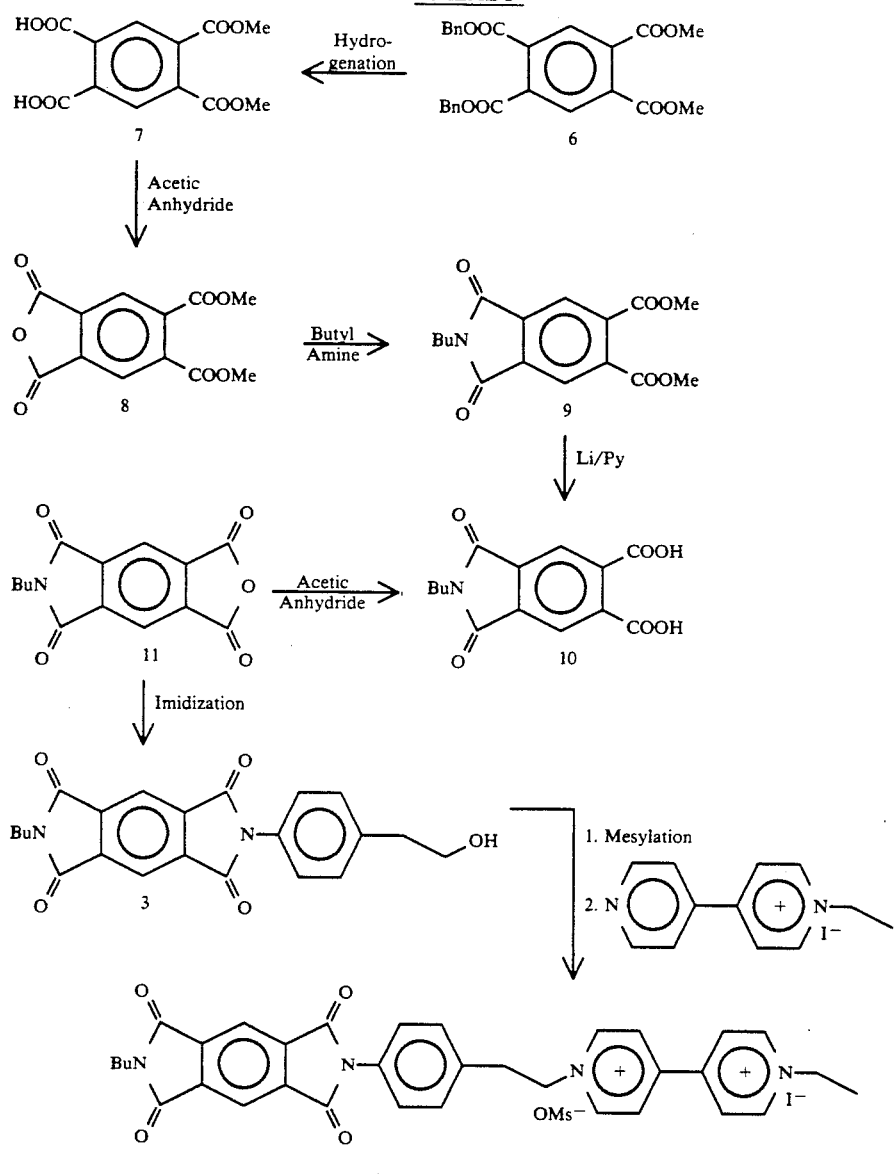

Many variations are possible at the second imidization step. One important variation in particular is the identity and length of the spacer group between the bis-imide and violene moieties. Of particular interest are oxyethylene spacers of the indication that polyimides containing oxyethylene chains were unusually crystalline as described in *Polymer Preprints*, 1985, 26 (2), 287 to Harris, F. W. et al.

Changes in the bis-imide and violene components will allow fine tuning of the reduction potentials. Varying these components in conjunction with varying spacer groups affects the redox and solid state properties of these materials.

Solvents and reagents were reagent grade or better and were used as received except where otherwise noted. IR spectra were obtained on a Perkin Elmer 1310 spectrophotometer (KBr pellet unless otherwise indicated). The IR data include all absorptions in the region 3500-1500 cm$^{-1}$ but only the prominent absorptions in the region 1500-200 cm$^{-1}$. UV-Vis spectra were run on a Hewlett-Packard 8452A diode array spectrometer. Proton NMR were recorded on an IBM 270 MHz instrument at room temperature in acetone-d$_6$ unless otherwise stated. Melting points were determined on a Fisher-Johns apparatus and are uncorrected.

DIELS-ALDER ADDUCT 5

A mixture of 1.2 g (4.1 mmol) dibenzyl acetylenedicarboxylate and 0.75 g (4.1 mmol) of 3,4-dicarbomethoxyfuran were refluxed (under argon) in xylene for 24 h. Removal of solvent by rotary evaporation, followed by preparative TLC (2 mm thick silica gel plates; EtOAc/Hexane, 1:4) gave 0.96 g (50%) of the Diels-Alder adduct (the band corresponding to the lowest R$_f$). Dibenzyl acetylenedicarboxylate (8%) was recovered (the band corresponding to the highest R$_f$). Attempted purification of the Diels-Alder product by distillation led to retro-Diels-Alder reaction. Product 4 was a viscous syrup; IR (1% CHCl$_3$ solution): 3030, 2960, 1740, 1720, 1440, 1300, 1260, 1125 cm$^{-1}$; $^1$H NMR: $\delta$ 7.37(m, 10H, Ar H), 6.04 (s, 2H, CH) 5.21 (s, 4H, CH$_2$, 3.7 (s, 6H, CH$_3$).

DIBENZYL 4,5-DICARBOMETHOXYPHTHALATE 6

Twice-distilled 1,2-dimethoxyethane (DME) (once over CaH$_2$ and then over K) was used for this experiment. A three-necked round bottomed flask was first thoroughly flushed with dry argon. TiCl$_4$ (4 mL, 31 mmol) was syringed into the flask and cooled to 0° C. DME (20 mL) was slowly syringed into the flask. A yellow solid separated. Lithium aluminum hydride (LAH, 120 mg, 3 mmol) was added very cautiously so as to avoid abrasion which can cause the LAH to ignite. The yellow solid dispersed, the color changed to green and finally to black. The cooling bath was removed. Triethylamine (1 mL, 7.2 mmol) was added and the contents of the flask were refluxed at 85° C. for 15 min. The flask was then cooled to room temperature. The Diels-Alder adduct 4 (471.3 mg, 1 mmol) was added to the flask and the contents stirred at room temperature for 1.5 h. The reaction was worked up by adding 100 mL of ice water and extracting thrice with methylene chloride. Addition of excess water helps clarify the deep violet/blue color and helps in the separation of the two layers clearly. The organic extract was dried over magnesium sulfate and evaporated to give 430 mg of the product (93% crude yield). The flask containing the organic extract developed a white non removable deposit on walls due to titanium dioxide. Viscous liquid; IR (1% CHCl$_3$ solution): 3040, 2960, 1740, 1270, 1135, 1110 cm$^{-1}$; $^1$H NMR $\delta$ 8.1 (s, 2H, Ar H, the ring having the four ester substituents), 7.42-7.38 (m, 10H, Ar H of the benzyl group), 5.27 (s, 4H, CH$_2$), 3.89 (s, 6H, CH$_3$).

3,4-DICARBOMETHOXYPHTHALIC ACID 7

A solution of 5 (260 mg, 0.56 mmol) in ethanol/ethyl acetate (20 mL, 3:1) containing 5% Pd/C (30 mg) was subjected to hydrogen at 60 psi in a Parr hydrogenator until the calculated amount of hydrogen was used up. The mixture was filtered through a bed of Celite and concentrated to yield 156.3 mg (98.9%) of the phthalic acid. White solid; mp: 162-164; IR: 3100, 2980, 1730, 1700, 1440, 1430, 1310, 1270, 1130, 1110, 800 cm$^{-1}$; H NMR: $\delta$8.11 (s, 2H, Aryl H), 3.91 (s, 6H, CH$_3$).

3,4-DICARBOMETHOXYPHTHALIC ANHYDRIDE 8

In a 100 mL round bottomed flask fitted with a condenser closed with a calcium chloride tube, 156.3 mg (0.55 mmol) of 7 and 0.5 ml of acetic anhydride were placed. The contents of the flask were refluxed gently for 15 min. On cooling white crystals appeared. The crystals were collected on a filter, washed with ether and purified by sublimation under high vacuum (0.05 torr) at an oil bath temperature of 130° C. to yield 110 mg (75%) of the anhydride 8. White solid; mp: 178.5°-179.5° C.; IR: 3110, 3040, 2980, 1860, 1790, 1740, 1720, 1440, 1300, 1250, 1100, 910, 900 cm$^{-1}$; $^1$H NMR: $\delta$ 8.38 (s, 2H, Aryl H), 3.95 (s, 6H, CH$_3$).

IMIDE 9

Distilled butylamine (0.075 mL, 0.05 g, 0.7 mmol) was added to a solution of (198.1 mg, 0.7 mmol) of 8 in dimethylformamide (DMF, 2 mL). The contents of the flask were stirred for half hour at room temperature and then refluxed for two hours at 150° C. under argon. Removal of the solvent by high vacuum distillation followed by preparative TLC (2 mm thick silica gel; EtOAc/Hexane 1:1) led to 178.3 mg (75% yield) of the product (the band corresponding to highest R$_f$). White crystals; mp: 63°-65° C.; IR: 2960, 2780, 1775, 1740, 1730, 1720, 1710, 1400, 1340, 1280 cm$^{-1}$; $^1$H NMR: $\delta$ 8.1 (s, 2H, Aryl H), 3.93 (s, 6H, CH), 3.67 (t, 2H, CH$_2$ $\alpha$ to the N), 1.65 (quintet, 2H, CH$_2$ $\beta$ to the imide N), 1.35 (sextet, 2H, CH$_2$ $\gamma$ to the imide N), 0.92 (t, 3H, CH$_3$).

DIACID 10

A pyridine (5 mL) solution of 9 (174.1 mg, 0.5 mmol) was heated under reflux in an argon atmosphere with 0.5 g (3.7 mmol) LiI for 2 h. The reaction mixture was cooled, the solvent evaporated, and finally water was poured into the flask and acidified to litmus with dilute HCl. The ethereal extract of this mixture was washed twice with 2N HCl, with brine containing small amounts of sodium sulfite to remove traces of iodine, dried over MgSO$_4$, and evaporated to yield 155.6 mg (98% yield) of the diacid 10. Colorless solid; mp: turned brown at 120° C., vaporized at 172°-173° C.; IR 3410, 3100, 2980, 1780, 1740, 1710, 1400, 1370, 1140 cm$^{-1}$; $-^1$H NMR $\delta$ 10.2 (br s, COOH), 8.12 (s, 2H, aryl H), 3.68 (t, 2H, CH$_2$ $\alpha$ to the N), 1.66 (quintet, 2H, CH$_2$ $\beta$ to the imide N), 1.38 (sextet, 2H, CH$_2$ $\gamma$ to the imide N, 0.93 (t, 3H, CH$_3$).

ANHYDRIDE 11

Diacid 10 (155.6 mg) and 0.5 mL of acetic anhydride were refluxed for 30 min in a flask fitted with a condenser capped with a drying tube of calcium chloride. The flask was then cooled to room temperature and 112 mg (80%) of the product was collected by filtration. White solid; IR 3100, 3050, 2980, 2965, 2880, 1860, 1780, 1700, 1405, 1300, 1280, 1180, 910, 620 cm$^{-1}$; $^1$H NMR $\delta$8.42 (s, 2H, Aryl H), 3.73 (t, 2H, CH$_2$ $\alpha$ to N), 1.65 (quintet, 2H, CH$_2$ $\beta$ to the imide N), 1.36 (sextet, 2H, CH$_2$ $\gamma$ to the imide N), 0.9 (t, 3H, CH$_3$).

BISIMIDE 3 p-Phenethyl alcohol (29 mg, 0.2 mmol) was added to a solution of 58 mg (0.2 mmol) of 11 in N-methylpyrrolidinone (1 mL). The contents of the flask were initially stirred at room temperature for 2 h, and then refluxed for 5 h under argon. The solvent was removed by high vacuum distillation and the contents in the flask were dissolved in large volumes of methylene chloride (the product is virtually insoluble in all other solvents tried). The methylene chloride layer was washed 2N HCl, brine, and finally with satd NaHCO$_3$ soln, dried over MgSO$_4$, filtered and evaporated to yield 66.4 mg (67% yield) of the unsymmetrical imide 3. Off-white solid; mp: 290° C. (condensation occurs on the microcover glasses), 305°-308° C. (decomp.); IR: 3400, 2960, 2940, 1780, 1720, 1700, 1400, 1190, 725 cm$^{-1}$; $^1$H NMR (CDCl$_3$): $\delta$ 8.63 (s, 2H, Aryl H), 7.6-7.5 (AA'BB', 4H, para substituted aryl ring H), 5.68 (br s, OH), 4 (t, 2H, C2$_2$) alpha to hydroxy), 3.72 (t, 2H, CH$_2$ alpha to the N), 3 (t, 2H, CH$_2$ alpha to the phenyl ring and beta to the hydroxy), 1.55 (quintet, 2H, CH$_2$ beta to the imide N), 1.23 (sextet, 2H, CH$_2$ $\gamma$ to the imide N), 0.8 (t, 3H, CH$_3$).

MESYLATE 12

A stirred solution of 64 mg (0.16 mmol) of 3 in 70 mL of methylene chloride was cooled under argon to −10° C. and treated with 0.5 mL (363 mg, 3.6 mmol) of triethylamine followed by dropwise addition of 0.3 mL (0.44 g, 3.9 mmol) of methanesulfonyl chloride. The flask was stored at 0°-5° C. overnight. The solution was poured into a sep funnel containing ice, washed successively with with 2N HCl, brine, and satd NaHCO$_3$ soln; dried over MgSO$_4$, filtered, and evaporated to give 71 mg (93% yield) of the mesylate 12. White solid; mp: decomposed to a black mass 150°-200° C.; IR: 2960, 2940, 1780, 1720, 1700, 1170, 1090, 725 cm$^{-1}$; $^1$H NMR (CDCl$_3$): δ 8.3 (s, 2H, Aryl H), 7.35 (s, 4H, para-substituted aryl ring H), 4.39 (t, 2H, CH$_2$ α to OSO$_2$Mc grouping), 3.7 (t, 2H, C2$_2$ α to N), 3.04 (t, 2H, CH$_2$ α to phenyl ring), 1.63 (quintet, 2H, CH$_2$ β to imide N), 1.32 (sextet, 2H, CH$_2$ γ to imide N), 0.89 (t, 3H, CH$_3$).

VIOLOGEN BIS-IMIDE 16

Monoethylbipyridinium iodide (REF) (32.3 mg, 0.1 mmol) was added to a solution of 71 mg (0.15 mmol) of mesylate 12 in DMF (1 mL). The contents of the flask were refluxed overnight at 138° C. under a blanket of argon. DMF was removed by high vacuum distillation, and the product in the flask was stirred with 30 mL of methylene chloride to dissolve the excess mesylate 12. Filtration through a sintered glass funnel led to an yield of 46 mg (60%) of the orange-red product. mp: >250° C.; UV (DMF): 250 nm (ε 19,700), 402 nm (ε980); IR: 3440, 2920, 2960, 1770, 1720, 1630, 1390, 1200, 1080, 840, 720 cm$^{-1}$; $^1$H NMR (DMF-d$_7$): δ 9.74 (AA'BB', 4H, Aryl H α to the positively charged N), 9 (overlapping AA'BB', 4H, aryl H β to the positively charged N), 8.28 (s, 2H, Aryl H), 7.55 (AA'BB', 4H, para-substituted aryl ring H), 5.28 (t, 2H, CH$_2$ alpha to N$^+$ and methylene), 4.97 (t, 2H, CH$_2$ alpha to N$^+$ and methyl), 3.67 (overlapping triplet, 4H, CH$_2$ α to imide N and CH$_2$ α to phenyl ring), 2.46 (s, 3H, SO$_2$Me), 1.72 (t, 3H, CH$_3$ of the ethyl group), 1.62 (quintet, 2H, CH$_2$ β to imide N), 1.34 (sextet, 2H, CH$_2$ γ to imide N), 0.91 t, 3H, CH$_3$ of butyl group).

The cyclic voltammogram obtained of a 1 mM solution of 1 in DMF with 0.1M tetrabutylammonium tetrafluoroborates the electrolyte at 50 mV/sec is shown in FIG. 2 (voltages were measured against SCE).

The UV of the various species generated at the different potentials is shown by the side of the structure generated in FIG. 3.

The following are examples contemplated as acceptors and donors for intermolecular charge transfer salts. This list is exemplary only and not limiting.

Donors:

N,N'-Dialkyl 4,4'-bipyridine compounds
N,N'-Dialkyl 2,2'-bipyridine compounds
N,N'-Dialkyl 1,10-Phenanthroline compounds
N,N'-Dialkyl 3,8-Phenanthroline compounds
O,O'-4,4'-dipyryline compounds
Phthalocyanine metal complexes
N-Alkyl pyridine compounds.

Acceptors:

N,N'-Dialkyl or diaryl pyromellitimides
N,N'-Dialkyl or diaryl 1,4,5,8-naphthalenetetracarboxylic diimides
N,N'-Dialkyl or diaryl 3,4,9,10-perylenetetracarboxylic diimides
N,N'-Dialkyl or diaryl 3,3',4,4'-biphenyl tetracarboxylic diimides
N,N'-Dialkyl or diaryl 3,3'4,4'-benzophenonetetracarboxylic diimide Any of the above with cyano, bromo, chloro or fluoro substituents on one or more of the aromtic rings.

The following compounds are examples contemplated as intramolecular charge transfer salts. This list is exemplary only and not limiting X$^-$ and Y$^-$ represent any anion. R is preferabyl an alkyl group.

INTRAMOLECULAR CHANGE TRANSFER SALTS

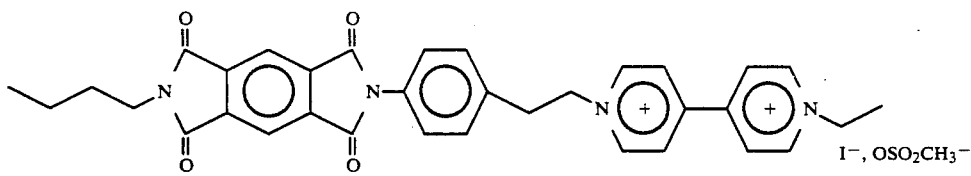

1)

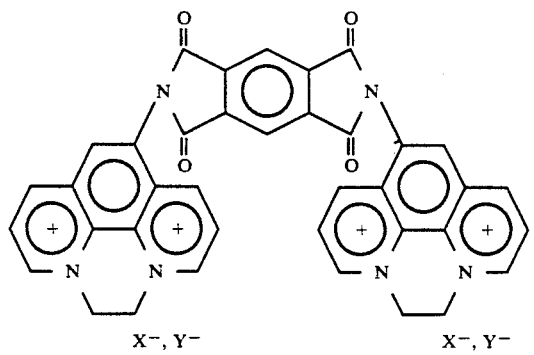

2)

-continued
INTRAMOLECULAR CHANGE TRANSFER SALTS
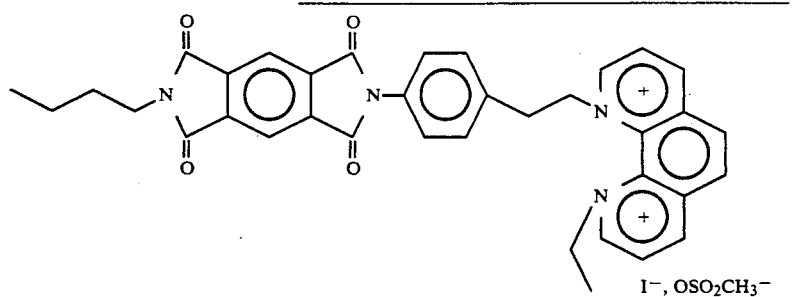
3)
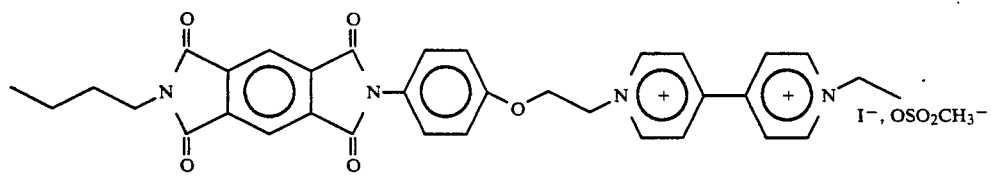
4)
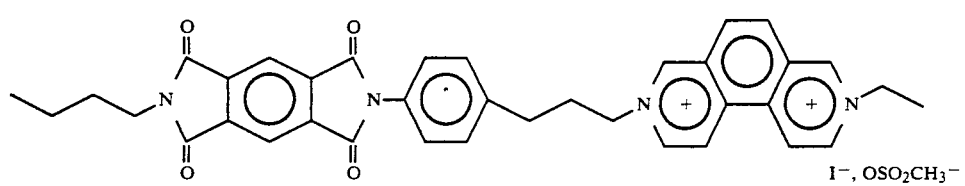
5)
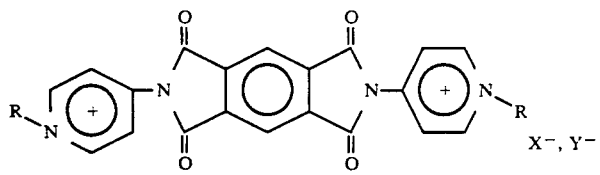
6)
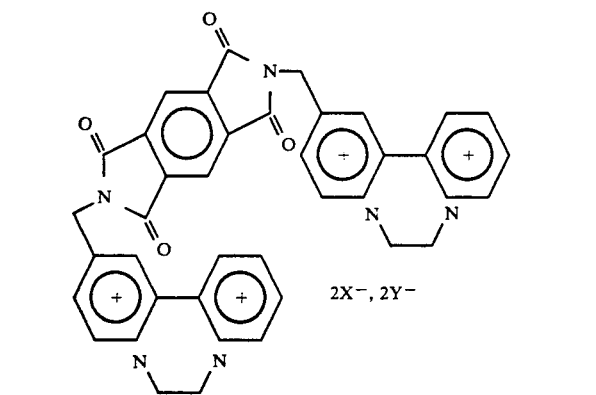
7)
The following compounds are examples contemplated as polymeric intramolecular charge transfer salts. This list is exemplary only and not limiting.
POLYMERIC-VERSIONS
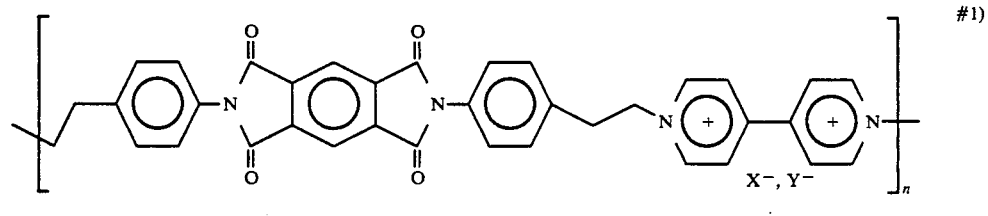
1)

-continued
POLYMERIC VERSIONS

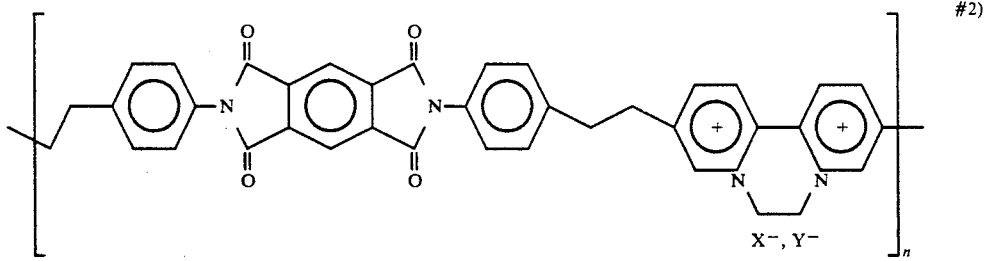

2)

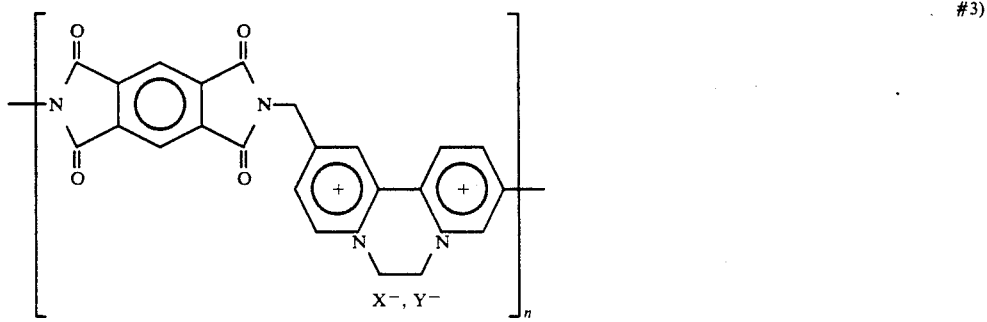

3)

It is contemplated that the first polymeric version can be achieved by hydrogenating 13 in the presence of pyromellitic anhydride, isolating the amic acid and then dehydrating the amic acid under standard conditions to obtain the imide. It is contemplated that the third polymeric version can be achieved by the displacement reaction of pyromellitimide dianion on the 4-Monobromomethyl-2,2'-bipyridyl.

Examples of acceptor molecules for intramolecular charge transfer salts are selected from the following list which is exemplary only and not limiting: radicals of compounds containing a carbonyl group conjugated to a substituted and unsubstituted aromatic moiety represented by the following structure:

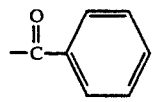

Aromatic imide compounds and benzoyl compounds contain this group. Examples of aromatic imide compounds are polyimides and modified polyimides and terephthalates. The Encyclopedia of Chemical Technology Third Edition article entitled, "Polyimides", Vol. 18, p. 704–719, the teaching of which is incorporated by reference, describes various polyimide materials including homopolymers.

Examples of acceptor moieties for intramolecular charge transfer salts are selected from radicals of substituted and unsubstituted forms of the following list of neutral compounds which is exemplary only and not limiting: unsaturated aromatic hydrocarbons, aromatic carbonyl compound, imides, diimides, carbodiimides, anhydrides, quinones, quarternary aromatic nitrogen compounds, azomethanes, immonium salts, azo compounds, amine oxides, nitro and nitroso compounds, organometallic compounds, quinolines and quinoxalines.

Examples of donor moieties for intramolecular charge transfer salts are selected from the violene compounds which are described in the Hunig articles incorporated by reference herein above.

It is contemplated that the intermolecular and intramolecular charge transfer salts described herein can be crystallized according to the electrocyrstallization technique described by Bechgard et al. in J. Am. Chem. Soc., 103, 2440, the teaching of which is incorporated herein by reference, and by the crystallization techniques described in Guide For The Organic Experimentalist, H. Loewenthal, Pub. Haden (in particular at p. 97) the teaching of which is incorporated herein by reference. Reduction of compound 16 using the fully reduced viologen, following addition of a nonsolvent to grow crystals will produce the state that the molecule is contemplated to show conductivity. It is contemplated that polymerization is achievable by well established methods, described herein, C. E. Sroog, J. Polymer Sci.: Macromolecular Reviews, Vol. 11, pp. 161–208 (1976), the teaching of which is incorporated herein by reference. Scheme A and scheme B below are exemplary only and not limiting.

SCHEME A
SYNTHESIS OF POLYMERS
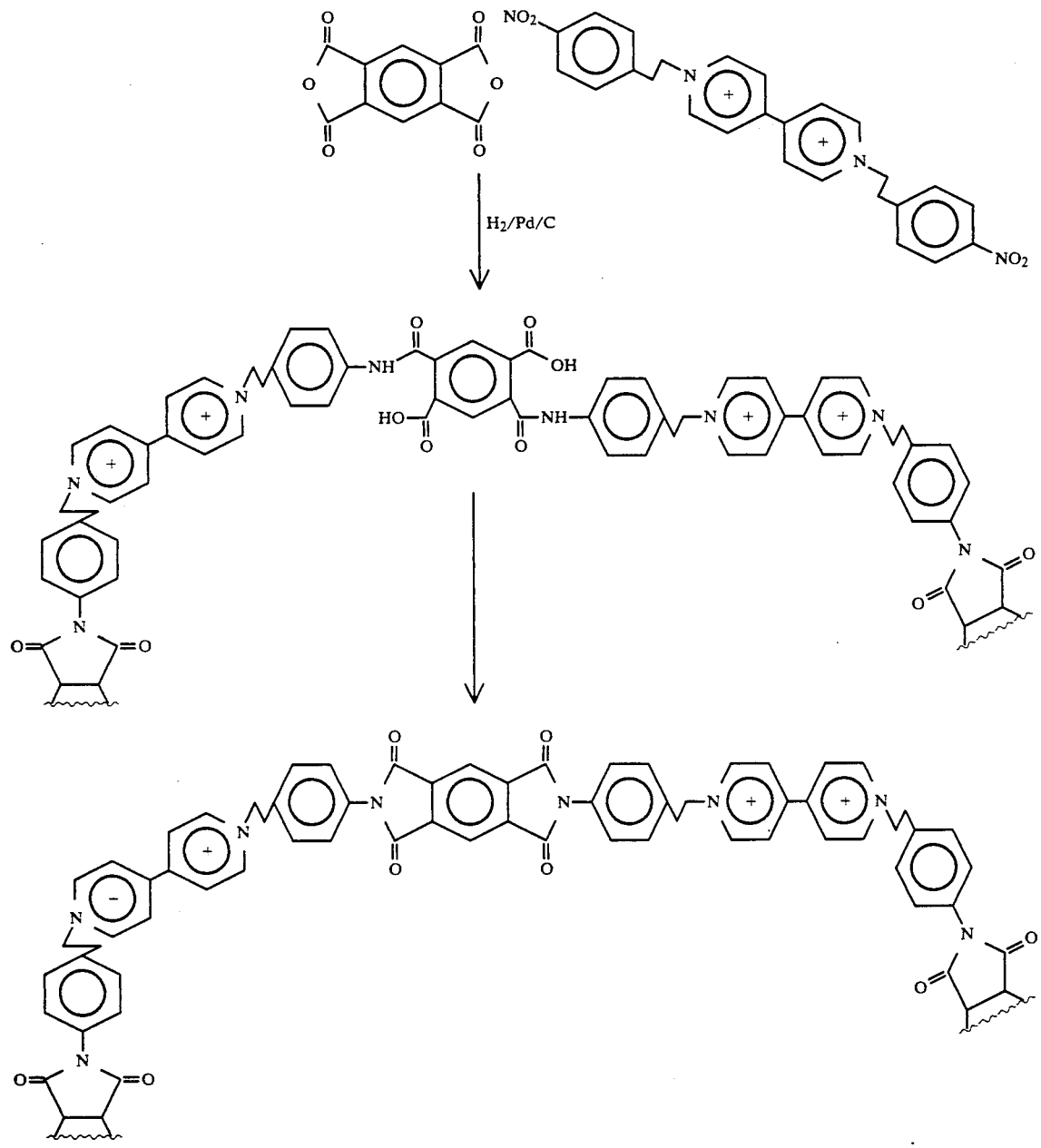
SCHEME B
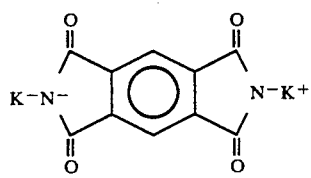

-continued
SCHEME B

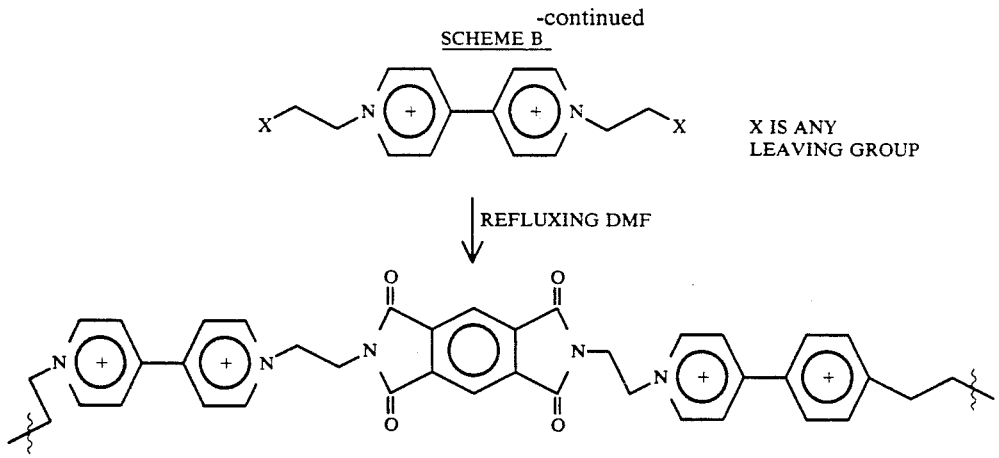

X IS ANY LEAVING GROUP

PREPARATION OF INTERMOLECULAR CHARGE TRANSFER SALT

Using a literature procedure (M. Mohammad, *J. Org. Chem.* 1987, 52, 2779–2782.), diethyl viologen diiodide was reduced by stirring in acetonitrile over magnesium turnings for 12–24 hours. This reaction and all subsequent steps were carried out in a nitrogen glove box. The red-orange solution was decanted from the excess magnesium and evaporated. The solid residue was dissolved in pure n-heptane (distilled under nitrogen from sodium). The heptane solution was passed through an ultrafine fritted glass filter to remove magnesium iodide, then evaporated. The darkly colored residue was then dissolved in pure dimethoxyethane (DME, distilled from sodium under nitrogen). The concentration of reduced viologen in the solution was measured by coulometry of a 1-ml aliquot in 50 ml of 0.1M tetrabutylammonium fluoroborate in dimethylformamide. This concentration was then used to calculate an equimolar amount of N,N-dibutylpyromellitimide which was weighed and dissolved in the DME solution of reduced viologen. Dilution of the homogeneous solution with 3–4 times its volume of n-heptane and chilling at $-20°$ C. resulted in precipitation of a fine, purple powder. Four point probe measurements of pressed pellets of this powder showed conductivities of $10^3$–$10^4$ S/cm. under argon. Conductivity degraded in air.

Small crystals of this material were obtained by exposing the DME solution of the 1:1 viologen/pyromellitimide mixture to n-heptane vapors in a closed container. Slow inter-diffusion of the solvents resulted in crystal growth at the bottom of the container which originally contained the DME solution. According to the teachings of the present invention electrochemically color changing films can be formed. For example, a violene or cyanine, e.g. a viologen, can be polymerized and disposed onto an electrode. A counterion and a monomeric compound having an imide group conjugated to an aromatic moiety, e.g. a bis-imide, can be deposited onto the film into which it is absorbed to form a color changing film. Alternatively, the compound containing a carbonyl group conjugated to an aromatic moiety, e.g. a bis-imide, can be polymerized and disposed onto an electrode and a violene or cyanine can be disposed onto the polymer into which it is absorbed to form an electrochemical color changing film. By the methods of the present invention it is contemplated that these films can be made electrically conductive. U.S. Pat. No. 4,571,029 to Skotheim et al., the teaching of which is incorporated herein by reference, teaches an electrochemical color change cell having a conducting polymer on an electrode. The conducting polymer contains color changing pigments which change color when the voltage is changed between the display electrode and the counter electrode. Polymers and other electroactive materials with redox sites are capable of electrical conduction when swelled with an eletrolyte as described in copending patent application Ser. No. 07/290,486 filed Dec. 23, 1988, entitled "Method For Conditioning An Organic Polymeric Material" which is assigned to the assignee of the present invention, the teaching of which is incorporated herein by reference and as described in copending U.S. patent application Ser. No. 07/411,952 filed on Sep. 25, 1989 entitled "Multilayered Structures Of Different Electroactive Materials and Methods Of Fabrication Thereof" which is assigned to the assignee of the present invention.

It is to be understood that the above described embodiments are simply illustrative of the principles of the invention. Various other modifications and changes may be devised by those of skill in the art which will embody the principles of the invention and fall within the spirit and scope thereof.

We claim:

1. An electrochemical color change cell comprising:
   a container;
   said container containing an electrolyte;
   at least two biasable electrodes within said container in contact with said electrolyte; and
   a color change agent in contact with with said electrolyte being selected from the group consisting of an intramolecular charge transfer salt and an intermolecular charge transfer salt, said intermolecular charge transfer salt containing a constituent having a carbonyl group conjugated to an aromatic moiety.

2. The electrochemical color change cell of claim 1, wherein said container is a sealed glass cell containing said electrolyte with said color change agent therein.

3. The electrochemical color change cell of claim 1 wherein said container includes a polymeric film having said electrolyte and said color change agent.

4. The electrochemical color change cell of claim 1 wherein said container includes a porous solid material containing said electrolyte and said color change agent.

5. The electrochemical color change cell of claim 1, further comprising an electrochromic display device.

6. The electrochemical color change cell of claim 1, wherein said intramolecular charge transfer salt is a covalent molecule capable of existing in a radical cation/radical anion state.

7. The electrochemical color change cell of claim 1 wherein said intramolecular charge transfer salt is a covalent compound containing at least one donor moiety and at least one acceptor moiety.

8. The electrochemical color change cell of claim 7 wherein said donor moiety is selected from the group consisting of radicals of violene compounds
and wherein said acceptor moiety is selected from the group consisting of radicals having an imide group conjugated to an aromatic moiety.

9. The electrochemical color change cell of claim 7, wherein said donor moiety is selected from a violene radical and a cyanine radical wherein said acceptor moiety is a bis-imide radical.

10. The electrochemical color change cell of claim 1, wherein said intermolecular charge transfer salt is a mixture of a violene compound and a bis-imide compound.

11. The electrochemical color change cell of claim 1, wherein said color change agent is formed from a polymerized compound selected from the group consisting of a violene and a cyanine and having a monomeric compound having a carbonyl group conjugated to an aromatic moiety in-contact with said polymerized violene.

12. The electrochemical color change cell of claim 1, wherein said color change agent is formed from a polymerized compound containing a carbonyl group conjugated to an aromatic moiety and having a compound selected from the group consisting of violenes and cyanines in contact with said polymerized group.

* * * * *